(12) United States Patent
Hokazono et al.

(10) Patent No.: US 6,718,946 B2
(45) Date of Patent: Apr. 13, 2004

(54) FUEL INJECTION DEVICE OF AN ENGINE

(75) Inventors: Yuichi Hokazono, Mishima (JP);
Tsuneo Tsutsui, Gotenba (JP);
Kazuhiro Omae, Atsugi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/462,780

(22) Filed: Jun. 17, 2003

(65) Prior Publication Data

US 2003/0234007 A1 Dec. 25, 2003

(30) Foreign Application Priority Data

Jun. 24, 2002 (JP) .................................... 2002-183214
Apr. 4, 2003 (JP) .................................... 2003-101510

(51) Int. Cl.⁷ .................................................. F02M 41/00
(52) U.S. Cl. ........................ 123/445; 123/446; 123/467
(58) Field of Search ............................. 123/445, 446, 123/447, 457, 434

(56) References Cited

U.S. PATENT DOCUMENTS 6,135,734 A * 10/2000 Isozumi et al. ............. 417/542

FOREIGN PATENT DOCUMENTS

| JP | A 6-101552 | 4/1994 |
| JP | A 2000-18074 | 1/2000 |
| JP | A 2001-164976 | 6/2001 |

* cited by examiner

Primary Examiner—Bibhu Mohanty
(74) Attorney, Agent, or Firm—Oliff & Berridge, PLC

(57) ABSTRACT

A device provided with a fuel injector and a reservoir for temporarily storing the fuel to be fed to the fuel injector. Fuel is injected at least two times in one engine cycle. Pulsation of fuel occurring in the fuel injector due to a prior fuel injection is propagated to the reservoir, reflected at the reservoir, and returns to the fuel injector. Due to the effects of the returned pulsation, the fuel injection amount in the later fuel injection fluctuates. The opening timing of the fuel injector and the fuel injection pressure are employed as parameters affecting the fuel injection amount in the later fuel injection, the amounts of fluctuation of the parameters due to the pulsation are estimated, and a control value relating to the operation of the fuel injector is controlled based on the estimated amounts of fluctuation of the parameters so that a target amount of fuel is injected from the fuel injector.

24 Claims, 16 Drawing Sheets

FUEL INJECTION DEVICE OF AN ENGINE

BACKGROUND OF THE INVENTION

1. Field of the Invention

The present invention relates to a fuel injection device of an internal combustion engine.

2. Description of the Related Art

A fuel injection device designed to consecutively inject fuel two times from a fuel injector in one engine cycle of an internal combustion engine is disclosed in Japanese Unexamined Patent Publication (Kokai) No. 2000-18074. In more detail, in the fuel injection device described in this publication, so-called "pilot injection" for injecting a small amount of fuel is performed immediately before the injection of fuel for driving the internal combustion engine.

When fuel is injected from a fuel injector, however, pulsation occurs in the fuel due to this fuel injection. If the fuel injector is communicated with a relatively large volume space such as a common rail, the pulsation arising due to the fuel injection will be transmitted to the common rail, reflected at the common rail, and again return to the fuel injector. If consecutively injecting fuel two times in one engine cycle as with the fuel injection device described in the above publication, the pulsation occurring due to the first fuel injection will return again to the fuel injector. Due to this, if the second fuel injection is performed while the fuel in the fuel injector is pulsating, the amount of fuel injection at the second fuel injection will end up deviating from the target amount.

SUMMARY OF THE INVENTION

An object of the present invention is to provide a fuel injection device which makes a fuel injector inject a target amount of fuel even if fuel in the fuel injector is pulsating.

To achieve this object, according to a first aspect of the invention, there is provided a fuel injection device provided with a fuel injector for injecting fuel to be fed into a combustion chamber of an internal combustion engine and a reservoir for temporarily storing fuel fed to the fuel injector, where fuel is injected at least two times in one engine cycle of the internal combustion engine, pulsation of fuel occurring in the fuel injector due to a prior injection comprised of a first fuel injection is transmitted to the reservoir, reflected at the reservoir, and returns to the fuel injector and, due to the effect of the returned pulsation, the fuel injection amount at a later injection comprised of a second fuel injection fluctuates, the fuel injection device of an internal combustion engine employing as parameters affecting the fuel injection amount at the later injection an opening timing of the fuel injector and an injection pressure of fuel from the fuel injector, estimating the amounts of fluctuation of the parameters at the later injection arising due to the pulsation, and controlling a control value relating to operation of the fuel injector based on the estimated amounts of fluctuation of the parameters at the later injection so that the target amount of fuel is injected from the fuel injector at the later injection.

In a second aspect of the invention, there is provided the first aspect of the invention, wherein the amounts of fluctuation of the parameters at the later injection represent the amount of fluctuation of the fuel injection amount at the later injection arising due to fluctuation in the parameters at the later injection, the amount of fluctuation of the fuel injection amount at the later injection arising due to fluctuation in the parameters at the later injection is estimated based on the estimated amounts of fluctuation of the parameters at the later injection, and a control value relating to operation of the fuel injector is controlled based on the estimated amount of fluctuation of the fuel injection amount at the later injection so that the target amount of fuel is injected from the fuel injector at the later injection.

In a third aspect of the invention, there is provided the first aspect of the invention, wherein a control value relating to operation of the fuel injector is controlled so that the fuel injection time at the later injection becomes a reference fuel injection time comprised of the fuel injection time in the case where the amount of fluctuation of the opening timing of the fuel injector at the later injection is zero.

In a fourth aspect of the invention, there is provided the first aspect of the invention, wherein a control value relating to operation of the fuel injector is controlled so that the opening timing of the fuel injector at the later injection becomes a reference opening timing comprising the opening timing in the case where the amount of fluctuation of the opening timing at the later injection is zero.

In a fifth aspect of the invention, there is provided the fourth aspect of the invention, wherein the amounts of fluctuation of the parameters at the later injection are calculated from functions having as variables the interval time comprised of the time from the prior injection to the later injection and, when a control value relating to operation of the fuel injector is controlled so that the opening timing at the later injection becomes the reference opening timing, the interval time used for estimating the amount of fluctuation of the fuel injection pressure at the later injection is calculated assuming that the fuel injector opens at the reference opening timing.

In a sixth aspect of the invention, there is provided the third aspect of the invention, wherein a control value relating to operation of the fuel injector is controlled so that a closing timing of the fuel injector at the later injection becomes a closing timing having the fuel injection time at the later injection as the reference fuel injection time.

In a seventh aspect of the invention, there is provided the first aspect of the invention, wherein an opening speed of the fuel injector is employed in addition to the above parameters.

In an eighth aspect of the invention, there is provided the first aspect of the invention, wherein when the fuel injection time at the later injection is shorter than a predetermined time, only the opening timing of the fuel injector is employed as a parameter.

In a ninth aspect of the invention, there is provided the first aspect of the invention, wherein the fuel injector has at least one injection hole for injecting fuel, a needle valve moving reciprocally inside the fuel injector and closing the injection hole, a first chamber storing fuel applying pressure to a wall surface of the needle valve at the injection hole side and to be injected from the injection hole, and a second chamber positioned at an opposite side to the first chamber relative to the needle valve and storing fuel, and the amount of fluctuation of the opening timing at the later injection is estimated based on a time-differentiated value of pressure of the fuel in the first chamber.

In a 10th aspect of the invention, there is provided the first aspect of the invention, wherein a relationships between amounts of fluctuation of the parameters at the later injection and the interval time when fixing conditions other than the interval time comprised of the time from the prior injection to the later injection are found in advance, and the amounts of fluctuation of the parameters at the later injection are estimated from the interval time based on the relationships.

In an 11th aspect of the invention, there is provided the 10th aspect of the invention, wherein the amounts of fluctuation of the parameters at the later injection differ according to the fuel injection time in the prior injection, the fuel injection time in the prior injection is employed as the condition other than the interval time, the relationships between the amounts of fluctuation of the parameters at the later injection and the interval time are found for the fuel injection time in the prior injection serving as a reference, and the amounts of fluctuation of the parameters at the later injection estimated based on the relationships are corrected in accordance with the fuel injection time at that time in the prior injection.

In a 12th aspect of the invention, there is provided the 10th aspect of the invention, wherein the amounts of fluctuation of the parameters at the later injection differ according to the fuel injection time at the later injection, the fuel injection time at the later injection is employed as the condition other than the interval time, the relationships between the amounts of fluctuation of the parameters at the later injection and the interval time are found for the fuel injection time at the later injection serving as a reference, and the amounts of fluctuation of the parameters at the later injection estimated based on the relationships are corrected in accordance with the fuel injection time at that time at the later injection.

In a 13th aspect of the invention, there is provided the 10th aspect of the invention, wherein the amounts of fluctuation of the parameters at the later injection differ according to at least one of an average pressure of the fuel and a temperature of the fuel, at least one of the average pressure of the fuel and the temperature of the fuel is employed as the condition other than the interval time, the relationships between the amounts of fluctuation of the parameters at the later injection and the interval time are found for the average pressure of the fuel serving as a reference and the temperature of the fuel serving as a reference, and the amounts of fluctuation of the parameters at the later injection estimated based on the relationships are corrected in accordance with at least one of the average pressure of the fuel at that time and the temperature of the fuel at that time.

In a 14th aspect of the invention, there is provided the 10th aspect of the invention, wherein the amounts of fluctuation of the parameters at the later injection differ according to the pulsation propagation speed in the fuel, the pulsation propagation speed in the fuel is employed as the condition other than the interval time, the relationships between the amounts of fluctuation of the parameters at the later injection and the interval time are found for the pulsation propagation speed in the fuel serving as a reference, and the amounts of fluctuation of the parameters at the later injection estimated based on the relationships are corrected in accordance with the pulsation propagation speed in the fuel at that time.

In a 15th aspect of the invention, there is provided the 14th aspect of the invention, wherein the amounts of fluctuation of the parameters at the later injection estimated based on the above relationships are corrected so that the faster the pulsation propagation speed in the fuel at that time, the shorter the interval time the amounts of fluctuation correspond to.

In a 16th aspect of the invention, there is provided the 14th aspect of the invention, wherein the pulsation propagation speed in the fuel is calculated from a function having at least one of the average pressure of the fuel and the temperature of the fuel as a variable.

In a 17th aspect of the invention, there is provided the 14th aspect of the invention, wherein the device is provided with a pressure sensor for detecting a pressure of the fuel and a change in pressure of the fuel found from an output value of the pressure sensor is used to calculate the pulsation propagation speed in the fuel.

In an 18th aspect of the invention, there is provided the 17th aspect of the invention, wherein the propagation speed is calculated when a predetermined condition stands.

In a 19th aspect of the invention, there is provided the 18th aspect of the invention, wherein the predetermined condition is that an extent of change of the average pressure of the fuel is smaller than a predetermined extent.

In a 20th aspect of the invention, there is provided the 18th aspect of the invention, wherein the predetermined condition is that the average pressure of the fuel is a predetermined pressure and the predetermined pressure includes a plurality of values.

In a 21st aspect of the invention, there is provided the 18th aspect of the invention, wherein a pulsation propagation speed in the fuel when the temperature of the fuel is a predetermined reference temperature and the average pressure of the fuel is a predetermined reference pressure is stored in advance as a reference propagation speed, the predetermined condition is that the temperature of the fuel is the reference temperature and the average pressure of the fuel is the reference pressure, and the propagation speed calculated when the predetermined condition stands is made the reference propagation speed.

In a 22nd aspect of the invention, there is provided the 17th aspect of the invention, wherein the device is provided with a plurality of fuel injectors, fuel is fed to these fuel injectors from the reservoir, and the pulsation propagation speed in the fuel is calculated for the fuel injector at the location furthest from the pressure sensor.

In a 23rd aspect of the invention, there is provided the 10th aspect of the invention, wherein the amounts of fluctuation of the parameters at the later injection differ in accordance with the average pressure of the fuel, the average pressure of the fuel is employed as the condition other than the interval time, the relationships between the amounts of fluctuation of the parameters at the later injection and the interval time are found for the average pressure of the fuel serving as a reference, the estimated amounts of fluctuation of the parameters at the later injection are corrected so that the amount of fluctuation of the fuel injection amount at the later injection becomes larger in a plus direction when the average pressure of the fuel at that time is higher than the average pressure of the fuel serving as a reference, and the estimated amounts of fluctuation of the parameters at the later injection are corrected so that the amount of fluctuation of the fuel injection amount at the later injection becomes larger in a minus direction when the average pressure of the fuel at that time is lower than the average pressure of the fuel serving as a reference.

In a 24th aspect of the invention, there is provided the first aspect of the invention, wherein fuel is injected at least three times in one engine cycle of the internal combustion engine, and the total of the amounts of fluctuation of the parameters in the third fuel injection arising due to pulsation occurring due to the first fuel injection and the amounts of fluctuation of the parameters in the third fuel injection arising due to pulsation occurring due to the second fuel injection are made the amounts of fluctuation of the parameters in the third fuel injection.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
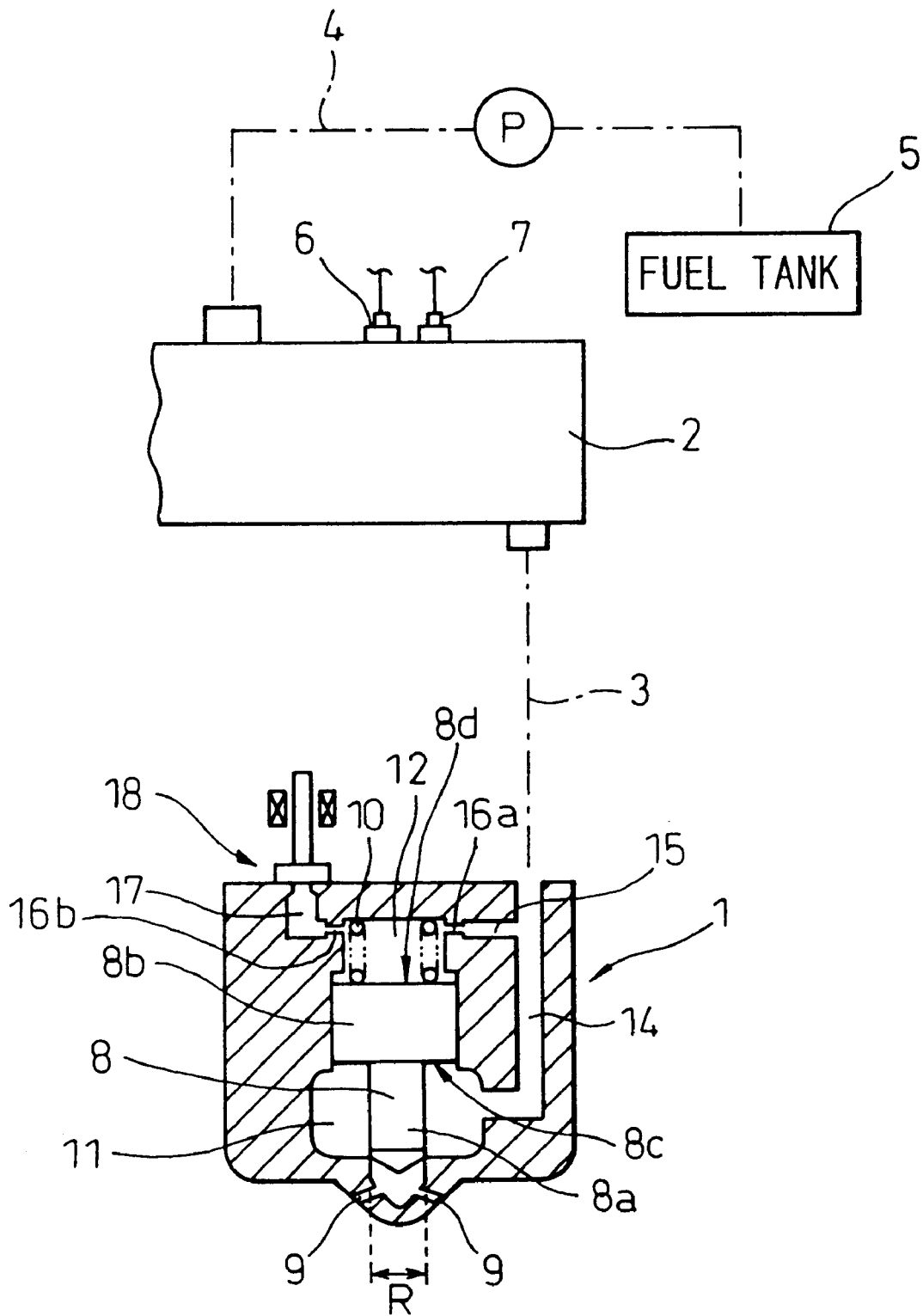
FIG. 1 shows a fuel injection device.

Preferred embodiments of the present invention will be described in detail below while referring to the attached figures. FIG. 1 shows a fuel injection device. This fuel injection device is provided with a fuel injector 1 for injecting fuel to be fed to a combustion chamber (not shown) of an internal combustion engine and a reservoir for temporarily storing the fuel to be fed to the fuel injector 1, that is, a so-called common rail 2. The fuel injector 1 and the common rail 2 are communicated with each other through a fuel feed passage 3. Further, the common rail 2 is communicated with a fuel tank 5 through a fuel feed passage 4. The fuel feed passage 4 between the common rail 2 and the fuel tank 5 is provided with a fuel pump P.

Further, the common rail 2 is provided with a pressure sensor 6 for detecting the pressure of the fuel in the common rail 2 (hereinafter, the "pressure of the fuel" being referred to as the "fuel pressure" and the "pressure of the fuel in the common rail" being referred to as the "rail pressure") and a temperature sensor 7 for detecting the temperature of the fuel in the common rail 2 (hereinafter the "temperature of the fuel" being referred to as the "fuel temperature" and the "temperature of the fuel in the common rail" being referred to as the "rail temperature").

The fuel injector 1 has a needle valve 8 moving reciprocally inside it. The tip of the fuel injector 1 is formed with a plurality of fuel injection holes 9. The needle valve 8 is biased toward the fuel injection holes 9 by a coil spring 10. At the fuel injection hole 9 side from the needle valve 8 is formed a nozzle chamber 11. At the opposite side is formed a control chamber 12. The nozzle chamber 11 and control chamber 12 are fed with fuel through the fuel feed passage 14. In more detail, the nozzle chamber 11 is directly fed with fuel through the fuel feed passage 14, but the control chamber 12 is fed with fuel through a fuel branch passage 16 branched from the fuel feed passage 14. The fuel branch passage 15 is provided with a constricted part 16a. Also, the control chamber 12 has connected to it a fuel exhaust passage 17 for exhausting the fuel from there. The fuel exhaust passage 17 adjoining the control chamber 12 is also provided with a constricted part 16b. The outlet of the fuel feed passage 17 is normally closed by a solenoid valve (or a valve of a type operating utilizing a piezoelectric actuator) 18 and is opened when injecting fuel from the fuel injector 1. That is, the solenoid valve 18 is normally closed and is made to open when injecting fuel from the fuel injector 1.

When the outlet of the fuel feed passage 17 is closed by the solenoid valve 18, at the nozzle chamber 11 side, the wall surface 8c of a large diameter portion 8b of the needle valve 8 other than the small diameter portion (portion corresponding to so-called "sheet radius R") of the needle valve 8 receives the fuel pressure in the nozzle chamber 11 (hereinafter called the "nozzle chamber pressure"). On the other hand, at the control chamber 12 side, the wall surface 8d of the large diameter portion 8b of the needle valve 8 receives the fuel pressure inside the control chamber 12 (hereinafter called the "control chamber pressure") and the bias force of the coil spring. In this case, the force making the needle valve 8 move toward the fuel injection holes 9 (that is, the total of the fuel pressure acting on the wall surface 8d and the bias force of the coil spring 10) is larger than the force making the needle valve 8 separate from the fuel injection holes 9 (that is, the fuel pressure acting on the wall surface 8c), so the fuel injection holes 9 are closed by the needle valve 8 and therefore no fuel is injected from the fuel injector 1.

That is, when the sectional area of a small diameter portion 8a of the needle valve 8 is As, the area of the wall surface 8d of the large diameter portion 8b of the needle valve 8 is An, the nozzle chamber pressure is Ps, the control chamber pressure is Pn, and the bias force of the coil spring 10 is Fs, the force Fdn acting on the wall surface 8d of the large diameter portion 8b of the needle valve 8 (that is, the force making the needle valve 8 move toward the fuel injection holes 9) is obtained from the following equation (1):

$$Fdn = Pn \cdot An + Fs \quad (1)$$

Further, the force Fup acting on the large diameter portion 8b of the needle valve 8 (that is, the force acting to try to make the needle valve 8 separate from the fuel injection holes 9) is obtained from the following equation (2):

$$Fup = Ps \cdot (An - As) \quad (2)$$

Further, when the solenoid valve 18 is closed, the nozzle chamber pressure Ps and the control chamber pressure Pn become equal. If the pressure at this time is P0, the following equation (3) is obtained from the above equations (1) and (2):

$$Fdn - Fup = Fs + P0 \cdot As \quad (3)$$

That is, the force Fdn acting to try to make the needle valve 8 move toward the fuel injection holes 9 is larger by exactly Fs+P0·As than the force Fup acting to try to make the needle valve 8 separate from the fuel injection holes 9. Therefore, in this case, the needle valve 8 closes the fuel injection holes 9 and no fuel is injected from the fuel injector 1.

Figure 2:
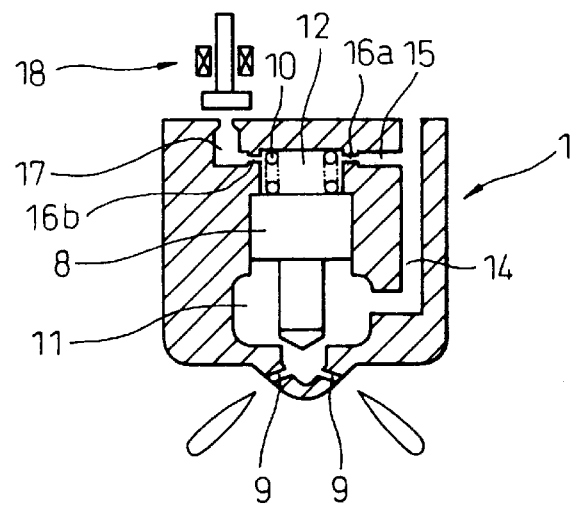
FIG. 2 shows a fuel injector injecting fuel.

On the other hand, as shown in FIG. 2, if the solenoid valve 18 opens and the outlet of the fuel feed passage 17 is opened, fuel inside the control chamber 12 is exhausted from the control chamber 12 through the fuel feed passage 17. Here, in this embodiment, the constricted part 16a provided in the fuel branch passage 16 and the constricted part 16b provided in the fuel feed passage 17 are formed so that fuel exactly commensurate with the amount of the fuel exhausted from the control chamber 12 through the fuel feed passage 17 does not immediately flow into the control chamber 12. Therefore, when the solenoid valve 18 is made to open, the control chamber pressure falls. Further, at this time, the constricted part 16b provided in the fuel feed passage 17 restricts the speed of decline of the control chamber pressure to a certain constant speed. That is, the speed of decline of the control chamber pressure is kept from becoming extremely fast by the constricted part 16b.

If the control chamber pressure gradually drops in this way and a certain time elapses, the force making the needle valve 8 move to be separated from the fuel injection holes 9 becomes larger than the force making the needle valve 8 move toward the fuel injection holes 9. Therefore, the needle valve 8 is made to move to be separated from the fuel injection holes 9 and fuel is injected from the fuel injector 9. That is, if the opening of the solenoid valve 18 results in the force Fdn acting to try to make the needle valve 8 move toward the fuel injection holes 9 becoming smaller by more than the above mentioned value Fs+P0·As, the needle valve 8 opens the fuel injection holes 9 and fuel is injected from the fuel injector 1.

Figure 3:
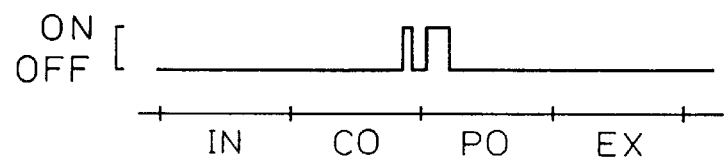
FIG. 3 shows a control signal sent to a fuel injector for making it inject fuel a plurality of times (two times) during one engine cycle of an internal combustion engine.
Figure 4:
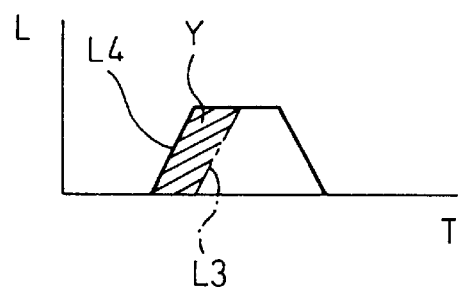
FIG. 4 shows a lift waveform of a needle valve for explaining the relationship between an opening timing of a fuel injector and a fuel injection amount.

Note that in this embodiment, fuel is injected from the fuel injector 1 consecutively two times during one engine cycle of the internal combustion engine, that is, in the period from one intake stroke to the next intake stroke. That is, as shown in FIG. 3, fuel is injected to inject a small amount of fuel at the end of the compression stroke (so-called pilot injection) and immediately afterward fuel is injected to inject fuel for driving the internal combustion engine (so-called main injection). The timings for performing these pilot injections and main injections can be changed in accordance with the demands on the internal combustion engine. Note that in FIG. 3, "IN" means the intake stroke, "CO" means the compression stroke, "PO" means the power stroke", and "EX" means the exhaust stroke. Further, "ON" means that a control signal for injecting fuel from the fuel injector 1 is emitted, while "OFF" means that no such control signal is emitted.

If fuel is injected consecutively two times in one engine cycle in this way, when the first fuel injection (pilot injection) has been performed, the nozzle chamber pressure temporarily falls and pulsation occurs in the fuel in the nozzle chamber 11. This pulsation is reflected at the common rail 2 and returns to the fuel injector 1 again. The returned pulsation causes the fuel in the fuel injector (in particular, the fuel in the nozzle chamber 11) to pulsate. If performing the second fuel injection (main injection) while the fuel in the nozzle chamber 11 is pulsating in this way, the amount of the fuel injected by the second fuel injection sometimes will end up deviating from the target amount.

For example, the pulsation reflected at the common rail 2 and returning to the fuel injector 1 immediately affects the fuel in the nozzle chamber 11, but affects the fuel in the control chamber 12 with somewhat of a delay. That is, since the fuel passage to the control chamber 12 is provided with the constricted part 16a, the pulsation affects the fuel inside the control chamber 12 delayed from when it affects the fuel in the nozzle chamber 11. Therefore, the degree of the effect of the pulsation on the nozzle chamber pressure and the degree of the effect of the pulsation on the control chamber pressure when the effect of pulsation reaches the fuel in the nozzle chamber 11 and the fuel in the control chamber 12 differ in many cases.

Here, the fuel injector 1 opens at a predetermined timing when the force pushing the needle valve 8 upward due to the nozzle chamber pressure becomes larger relative to the total force of the force pushing the needle valve 8 downward due to the control chamber pressure plus the bias force of the coil spring 10. Therefore, if the difference between the nozzle chamber pressure and the control chamber pressure differs from the above predetermined value due to the differences in degree of the effects of the pulsation in the above way, the opening timing of the fuel injector 1 (hereinafter called simply the "opening timing") will deviate from the predetermined timing. Therefore, the time taken from when a control signal for making the fuel injector 1 (that is, the needle valve 8) open to when the fuel injector 1 actually opens becomes shorter if for example the nozzle chamber pressure is larger than the control chamber pressure by more than the above predetermined value. Therefore, the opening timing becomes advanced if the nozzle chamber pressure is larger than the control chamber pressure by more than the above predetermined value. In this way, if the fuel in the nozzle chamber 11 pulsates, this will cause fluctuation in the opening timing.

Figure 5:
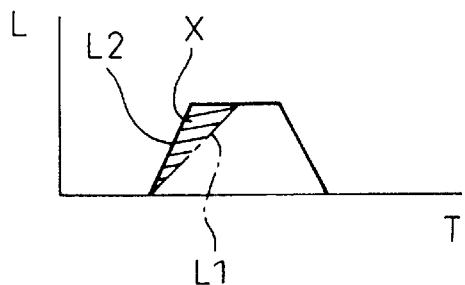
FIG. 5 shows a lift waveform of a needle valve for explaining the relationship between an opening timing of a fuel injector and a fuel injection amount.

If the opening timing fluctuates in this way, the fuel injection amount will also fluctuate due to its effects. For example, referring to the example shown in FIG. 5 expressing the lift L of the needle valve 8 of the fuel injector 1 by the time T, the needle valve 8 will reach the maximum lift at an earlier stage when the fuel injector 1 opens along the lift curve L4 of the case of an advanced opening timing compared with when the fuel injector 1 opens along the lift curve L3 of the case of a delayed opening timing, so the fuel injection amount will become greater by exactly the amount shown by the region Y.

Further, if the fuel injection amount fluctuates due to the effect of fluctuation of the opening timing in this way, the amount of fluctuation of the opening timing and the amount of fluctuation of the fuel injection amount due to the same will exhibit a certain correlation. That is, it is possible to estimate the amount of fluctuation of the fuel injection amount from the amount of fluctuation of the opening timing arising due to pulsation of the fuel in the nozzle chamber 11.

Further, the injection pressure of the fuel from the fuel injector 1 also fluctuates due to pulsation of the fuel in the nozzle chamber 11. If the fuel injection pressure fluctuates in this way, the fuel injection amount will also fluctuate under its effect. Further, in this case, the amount of fluctuation of the fuel injection pressure and the amount of fluctuation of the fuel injection amount arising due to the same will exhibit a certain correlation. That is, it is possible to estimate the amount of fluctuation of the fuel injection amount from the amount of fluctuation of the fuel injection pressure arising due to pulsation of the fuel in the nozzle chamber 11.

Further, the opening speed of the fuel injector 1 (that is, the opening speed of the needle valve 8, hereinafter called the "needle speed") becomes a predetermined speed when the difference between the nozzle chamber pressure and the control chamber pressure is a predetermined value. Therefore, if the difference between the nozzle chamber pressure and the control chamber pressure differs from the predetermined value due to the differences in degree of effect of the pulsation in the above way, the needle speed will deviate from the predetermined speed. For example, the needle speed will become faster the higher the nozzle chamber pressure from the control chamber pressure. Therefore, if the fuel in the nozzle chamber 11 pulsates, the needle speed will also fluctuate due to this.

If the needle speed fluctuates in this way, the fuel injection amount will also fluctuate under its effect. For example, if referring to the example shown in FIG. 5 expressing the lift L of the needle valve 8 by the time T, the needle valve 8 will reach the maximum lift at an earlier stage when the fuel injector 1 opens along the lift curve L2 of the case of a fast needle speed compared with when the fuel injector 1 opens along the lift curve L1 of the case of the slow needle speed, so the fuel injection amount will become greater by exactly the amount shown by the region X.

Further, when the fuel injection amount fluctuates due to the effect of fluctuation of the needle speed in this way, the amount of fluctuation of the needle speed and the amount of fluctuation of the fuel injection amount arising due to the same will exhibit a certain correlation. That is, it is possible to estimate the amount of fluctuation of the fuel injection amount from the amount of fluctuation of the needle speed arising due to the pulsation of the fuel inside the nozzle chamber 11.

Considering this situation, in the present embodiment, as parameters affecting the amount of fuel injected by the second fuel injection (hereinafter called the "main injection") (hereinafter called the "main injection amount"), use is made of the opening timing of the fuel injector 1 at the main injection (hereinafter called the "main injection timing"), the fuel injection pressure at the main injection (hereinafter referred to as the "main injection pressure"), and the needle speed at the main injection (hereinafter referred to as the "main injection needle speed") and the amounts of fluctuation of these parameters due to pulsation of the fuel are separately estimated. That is, the amount of fluctuation of each parameter due to pulsation of the fuel is estimated. Further, the amounts of fluctuation of the main injection amount due to the estimated amounts of fluctuation of the parameters are estimated from those amounts. Further, the estimated amounts of fluctuation of the main injection amount are totaled to calculate the total amount of fluctuation of the main injection amount, and a control value relating to the operation of the fuel injector 1 in the main injection (for example, the opening timing of the fuel injector 1) is controlled based on the total amount of fluctuation of the main injection amount so that the target amount of fuel is injected from the fuel injector 1 in the main injection.

More specifically, when the total amount of fluctuation of the main injection amount is a plus value and it is expected that the main injection amount will become greater, the control value relating to operation of the fuel injector 1 is corrected so that the opening timing of the fuel injector 1 in the main injection (hereinafter called the "main injection time") becomes shorter so that an amount of fuel smaller by exactly the total amount of fluctuation of the main injection amount is injected. Conversely, when the total amount of fluctuation of the main injection amount is a minus value and it is expected that the main injection amount will become smaller, the control value relating to operation of the fuel injector 1 is corrected so that the main injection time becomes longer so that an amount of fuel larger by exactly the total amount of fluctuation of the main injection amount is injected. According to this, even if main injection is performed while the fuel in the fuel injector 1 is pulsating, it will be possible to inject the initially targeted amount of fuel from the fuel injector 1.

Figure 6:
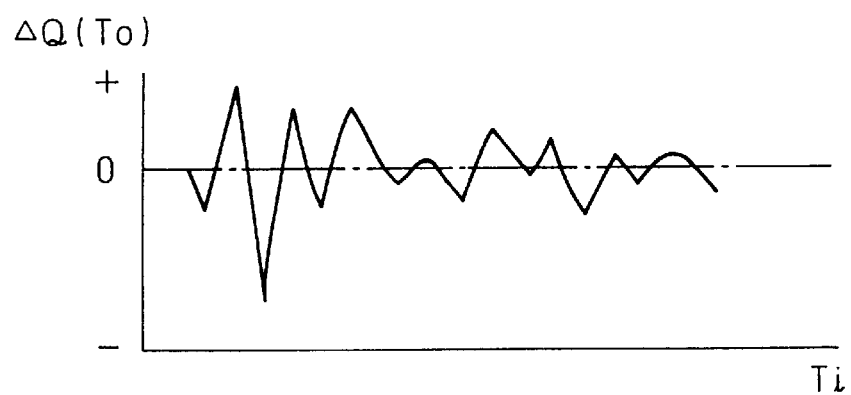
FIG. 6 shows the relationship between an interval time Ti and an amount of fluctuation $\Delta Q(To)$ of a main injection amount arising due to fluctuation in an opening timing of a fuel injector.

Next, the method of calculation of the amounts of fluctuation of the main injection amount arising due to fluctuations in the above three parameters will be explained. When the fuel in the nozzle chamber 11 is pulsating, the nozzle chamber pressure will change along with the elapse of time. Therefore, the amount of fluctuation of the main injection timing arising due to pulsation of the fuel in the nozzle chamber 11 will differ depending on the timing from when the pilot injection is started to when the main injection is started (hereinafter also called the "interval time"). Accordingly, the amount of fluctuation of the main injection amount arising due to fluctuation of the main injection timing will also differ according to the interval time. Here, the relationship between the interval time and the amount of fluctuation of the main injection amount arising due to fluctuation in the main injection timing becomes as shown in FIG. 6. If the relationship shown in FIG. 6 is known in advance in this way, the amount of fluctuation $\Delta Q(To)$ of the main injection amount arising due to fluctuation in the main injection timing can be learned from this relationship and the interval time Ti.

Therefore, in the present embodiment, the relationship such as shown in FIG. 6 is found in advance by experiments etc. and stored in the form of a map, and the amount of fluctuation $\Delta Q(To)$ of the main injection amount arising due to fluctuation in the main injection timing is estimated based on this map and the interval time Ti in each engine cycle. Note that the amount of fluctuation $\Delta Q(To)$ of the main injection amount ends up changing if the first fuel injection time (hereafter called the "pilot injection time"), the propagation speed of pulsation in the fuel (hereinafter called simply the "pulsation propagation speed"), and the average fuel pressure (fuel pressure when assuming no pulsation at all) change. Therefore, the map shown in FIG. 6 is found as a map of the relationship between the interval time when the pilot injection time is a certain constant time (hereinafter called the "first reference time"), the pulsation propagation speed is a certain constant speed (hereinafter called the "reference speed"), and the average fuel pressure is a certain constant pressure (hereinafter called the "reference pressure") and the amount of fluctuation of the main injection amount arising due to the fluctuation of the main injection timing (hereinafter also called the "reference map"). Further, when the pilot injection time deviates from the first reference time, the pulsation propagation speed deviates from the reference speed, or the average fuel pressure deviates from the reference pressure, as explained later, either the reference map is corrected or the amount of fluctuation of the main injection amount calculated from the reference map is corrected in accordance with the deviation.

Figure 7:
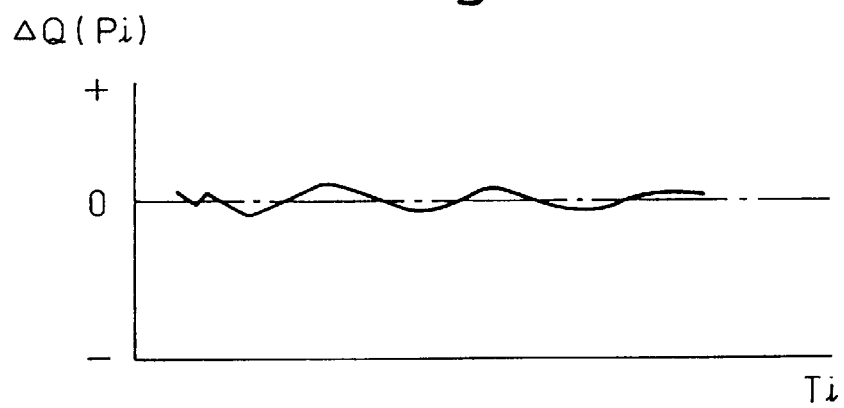
FIG. 7 shows the relationship between an interval time Ti and an amount of fluctuation $\Delta Q(Pi)$ of a main injection amount arising due to fluctuation in a fuel injection pressure.

In the same way, the amount of fluctuation of the fuel injection pressure arising due to pulsation of the fuel in the nozzle chamber 11 also differs depending on the interval time. Therefore, the amount of fluctuation of the main injection amount arising due to fluctuation of the fuel injection pressure also differs depending on the interval time. Here, the relationship between the interval time and the amount of fluctuation of the main injection amount arising due to fluctuation of the fuel injection pressure becomes as shown in FIG. 7. If the relationship shown in FIG. 7 is known in advance in this way, it becomes possible to learn the amount of fluctuation $\Delta Q(Pi)$ of the main injection amount arising due to fluctuation of the main injection timing from this relationship and the interval time Ti.

Therefore, in the present embodiment, the relationship such as shown in FIG. 7 is found in advanced by experiments etc. and stored in the form of a map, and the amount of fluctuation $\Delta Q(Pi)$ of the main injection amount arising due to fluctuation in the fuel injection pressure is estimated based on this map and the interval time Ti. Note that the amount of fluctuation $\Delta Q(Pi)$ of the main injection amount ends up changing if the pilot injection time, the main injection time, the pulsation propagation speed, or the average fuel pressure changes. Therefore, the map shown in FIG. 7 is found as a map of the relationship between the interval time when the pilot injection time is the first reference time, the main injection timing is a certain constant time (hereinafter called the "second reference time"), the pulsation propagation speed is the reference speed, and the average fuel pressure is the reference pressure and the amount of fluctuation of the main injection amount arising due to fluctuation of the fuel injection pressure (hereinafter referred to as a "reference map"). Further, when the pilot injection time deviates from the first reference time, the main injection time deviates from the second reference time, the pulsation propagation speed deviates from the reference speed, or the average fuel pressure deviates from the reference pressure, as. explained later, either the reference map is corrected or the amount of fluctuation of the main injection amount calculated from the reference map is corrected in accordance with the amount of deviation.

Figure 8:
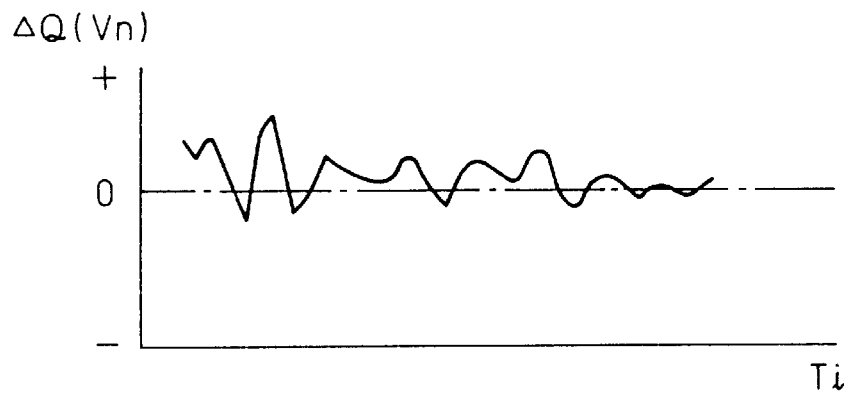
FIG. 8 shows the relationship between an interval time Ti and an amount of fluctuation $\Delta Q(Vn)$ of a main injection amount arising due to fluctuation in an opening speed of a fuel injector.

Similarly, the main injection needle speed arising due to pulsation of the fuel in the nozzle chamber 11 also differs depending on the interval time. Therefore, the amount of fluctuation of the main injection amount arising due to fluctuation in the main injection needle speed also differs depending on the interval time. Here, the relationship between the interval time and the amount of fluctuation of the main injection amount arising due to fluctuation of the main injection needle speed becomes as shown in FIG. 8. If the relationship shown in FIG. 8 is known in advance in this way, the amount of fluctuation $\Delta Q(Vn)$ of the main injection amount arising due to fluctuation of the main injection needle speed may be learned from this relationship and the interval time Ti.

Therefore, in the present embodiment, the relationship such as shown in FIG. 8 is found in advance by experiments etc. and stored in the form of a map. The amount of fluctuation $\Delta Q(Vn)$ of the main injection amount arising due to fluctuation in the main injection needle speed is estimated based on this map and the interval time Ti at each engine cycle. Note that the amount of fluctuation $\Delta Q(Vn)$ of the main injection amount also ends up changing if the pilot injection time, main injection time, pulsation propagation speed, or average fuel pressure changes. Therefore, the map shown in FIG. 8 is found as a map of the relationship between the interval time when the pilot injection time is the first reference time, the main injection time is the second reference time, the pulsation propagation speed is the reference speed, and the average fuel pressure is the reference pressure and the amount of fluctuation of the main injection amount arising due to fluctuation of the main injection needle speed (hereinafter also called the "reference map"). Further, when the pilot injection time deviates from the first reference time, the main injection time deviates from the second reference time, the pulsation propagation speed deviates from the reference speed, or the average fuel pressure deviates from the reference pressure, as explained later, either the reference map is corrected or the amount of fluctuation of the main injection amount calculated from the reference map is corrected in accordance with the amount of deviation.

Figure 9A:
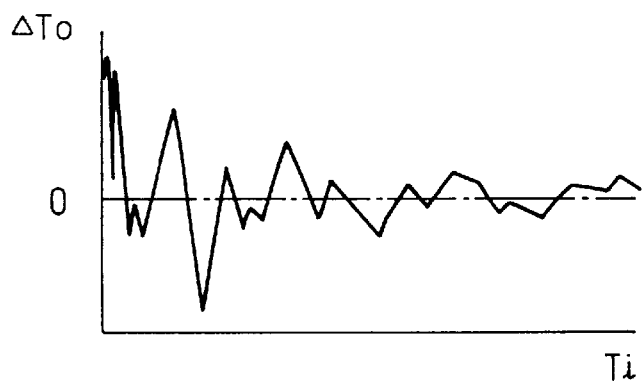
FIG. 9A shows the relationship between an interval time Ti and an amount of fluctuation $\Delta To$ of an opening timing of a fuel injector.
Figure 9B:
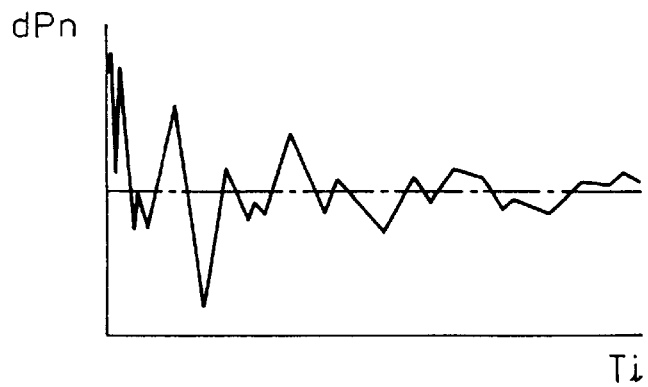
FIG. 9B shows the relationship between an interval time Ti and a time differentiated value dPn of a nozzle chamber pressure.

Note that the main injection timing and the time differentiated value of the pressure of the fuel in the nozzle chamber 11 exhibit a certain correlation such as shown in FIGS. 9A and 9B. That is, FIG. 9A shows the relationship between the interval time Ti and the amount of change $\Delta To$ of the main injection timing. FIG. 9B shows the relationship between the interval time Ti and the time differentiated value dPn of the nozzle chamber pressure. As clear from these FIG. 9A and FIG. 9B, the trend of the amount of fluctuation ΔTo of the main injection time and the trend of the time differentiated value dPn of the nozzle chamber pressure with respect to the interval time Ti exhibit the same behavior. Therefore, if the correlation between the time-differentiated value of the nozzle chamber pressure and the amount of fluctuation of the main injection timing is known in advance, the nozzle chamber pressure may be detected, the detected pressure value differentiated, and the amount of fluctuation of the main injection timing found from the time-differentiated value and the above correlation. Further, if the correlation between the amount of fluctuation of the main injection time and the amount of fluctuation of the main injection amount arising due to the same is known in advance, the amount of fluctuation of the main injection amount arising due to fluctuation of the main injection timing may be found from this relationship and the amount of fluctuation of the main injection timing found in the above way.

Therefore, in the above embodiment, the correlation between the time-differentiated value of the nozzle chamber pressure and the amount of fluctuation of the main injection timing is found in advance as a first correlation and the correlation between the amount of fluctuation of the main injection timing and the amount of fluctuation of the main injection amount arising due to this is found in advance as a second correlation. Further, the nozzle chamber pressure when a control signal for making the fuel injector open is emitted is differentiated and the amount of fluctuation of the main injection timing is calculated from this time-differentiated value and the above first correlation. Further, it is possible to calculate the amount of fluctuation of the main injection amount arising due to fluctuation of the main injection timing from the calculated amount of fluctuation of the main injection timing and the above second correlation.

Next, the method of correction of the reference maps or the method of correction of the amount of fluctuation of the main injection amount calculated from the reference maps when the pilot injection time deviates from the second reference time (for the fluctuation of the main injection timing, this main injection time is irrelevant), when the pulsation propagation speed deviates from the reference speed, or the average fuel pressure deviates from the reference pressure will be explained.

First, the method of correction of the reference maps or the method of correction of the amount of fluctuation of the main injection amount calculated from the reference maps when the pilot injection time deviates from the first reference time will be explained. As explained above, the relationships shown in FIG. 6 to FIG. 8 are the relationships when the pilot injection time is the first reference time. Further, when the pilot injection time is longer than the first reference time, the curves shown in FIG. 6 to FIG. 8 become curves with larger amplitudes and smaller frequencies. When the pilot injection time is shorter than the first reference time, the curves shown in FIG. 6 to FIG. 8 become curves with smaller amplitudes and larger frequencies.

Therefore, to calculate the accurate amount of fluctuation of the main injection amount from the reference maps of FIG. 6 to FIG. 8, the amount of fluctuation of the main injection amount arising due to fluctuation of the parameters calculated from the reference maps of FIG. 6 to FIG. 8 based on the interval time should be corrected in accordance with the amount of deviation of the pilot injection time with respect to the first reference time. Therefore, in the above embodiment, the longer the pilot injection time from the first reference time, the longer the interval time than the actual interval time the main injection amount corresponding to is calculated from the reference maps of FIG. 6 to FIG. 8. Further, when the calculated amount of fluctuation is a plus value, the calculated amount of fluctuation is enlarged by a predetermined ratio (this ratio may be freely determined). On the other hand, when the calculated amount of fluctuation is a minus value, this calculated amount of fluctuation may be reduced by a predetermined ratio (this ratio may also be freely determined and may be made equal to the above ratio or may be made different from the above ratio). Further, in the above embodiment, the shorter the interval time than the actual interval time the fuel injection amount corresponding to is calculated from the reference maps of FIG. 6 to FIG. 8. Further, when the calculated amount of fluctuation is a plus value, the calculated amount of fluctuation is reduced by a predetermined ratio (this ratio may also be freely determined and may be equal to the above ratio or different from the above ratio). On the other hand, when the calculated amount of fluctuation is a minus value, the calculated amount of fluctuation is increased by a predetermined ratio (this ratio may also be freely determined and may be equal to the above ratio or different from the above ratio).

Further, when correcting the reference maps, the longer the pilot injection time from the first reference time, the larger the amplitude and the smaller the frequency the relationships shown in FIG. 6 to FIG. 8 are corrected to. The amount of fluctuation of the main injection amount corresponding to the actual interval time is calculated based on the corrected relationships. On the other hand, the shorter the pilot injection time from the first reference time, the smaller the amplitude and the larger the frequency the relationships shown in FIG. 6 to FIG. 8 are corrected to. The amount of fluctuation of the main injection amount corresponding to the actual interval time is calculated based on the corrected relationships.

In this way, the reference maps may be corrected or the amount of fluctuation of the main injection amount calculated from the reference maps may be corrected in accordance with the amount of deviation of the actual pilot injection time from the first reference time. From this, if generally expressing correction based on the pilot injection time, it can be said that the amount of fluctuation of the main injection amount calculated from the relationships shown in FIG. 6 to FIG. 8 is corrected in accordance with the pilot injection time of that time.

Whatever the case, according to this, even if the actual pilot injection time deviates from the first reference time, the amount of fluctuation of the main injection amount can be accurately calculated.

Next, the method of correction of the reference maps or the method of correction of the amount of fluctuation of the main injection amount calculated from the reference maps when the main injection time deviates from the second reference time will be explained. As explained above, the relationships shown in FIG. 7 and FIG. 8 are the relationships when the main injection time is the second reference time. Therefore, if the main injection time deviates from the second reference time, the true amount of fluctuation of the fuel injection amount will deviate from the amount of fluctuation of the main injection amount calculated from the reference maps of FIG. 7 and FIG. 8. For example, when main injection is performed only in a time band where the fuel injection amount fluctuates in an increasing direction, the longer the main injection time, the more the true amount of fluctuation of the fuel injection amount will become toward the plus direction. Conversely, when the main injection is performed in a time band where the fuel injection amount fluctuates in a decreasing direction, the longer the main injection time, the more the true amount of fluctuation of the fuel injection amount will become toward the minus direction. Of course, in some cases the main injection will be performed straddling a time band where the fuel injection amount fluctuates in an increasing direction and a time band where the fuel injection amount fluctuates in a decreasing direction, so the amount of fluctuation of the main injection amount cannot be said flat out to become greater in the plus direction or become greater in the minus direction in accordance with the length of the main injection time. Whatever the case, however, the amount of fluctuation of the main injection amount can be said to change in accordance with the main injection time (of course, by chance sometimes the amount of fluctuation of the main injection amount may sometimes be zero depending on the main injection time).

Therefore, to calculate the accurate amount of fluctuation of the main injection amount from the reference maps of FIG. 7 and FIG. 8, the amount of fluctuation of the main injection amount arising due to fluctuation of the parameters calculated from the reference maps of FIG. 7 and FIG. 8 based on the interval time should be corrected in accordance with the amount of deviation of the main injection time with respect to the second reference time. Therefore, in the above embodiment, the amount of fluctuation of the main injection amount calculated from FIG. 7 and FIG. 8 is corrected in accordance with to what degree the time where the main injection is performed overlaps with either time band of the time band where the fuel injection amount fluctuates in an increasing direction and the time band where the fuel injection amount fluctuates in a decreasing direction.

Of course, the reference maps of FIG. 7 and FIG. 8 may also be corrected in accordance with to which degree the time where the main injection is performed overlaps with the time band where the fuel injection amount fluctuates in an increasing direction and the time band where the fuel injection amount fluctuates in a decreasing direction.

In this way, it is possible to correct the reference maps or correct to the amount of fluctuation of the main injection amount calculated from the reference maps in accordance the amount of deviation of the actual main injection time from the second reference time. From this, if generally expressing correction based on the main injection time, it can be said that the amount of fluctuation of the main injection amount calculated from the relationships shown in FIG. 7 and FIG. 8 is corrected in accordance with the main injection time at that time.

Next, the method of correction of the reference maps or the method of correction of the amount of fluctuation of the main injection amount calculated from the reference maps when the pulsation propagation speed deviates from the reference speed will be explained. As explained above, the relationships shown in FIG. 6 to FIG. 8 are the relationships when the pulsation propagation speed is the reference speed. Therefore, if the actual pulsation propagation speed becomes faster than the reference speed, the curves shown in FIG. 6 to FIG. 8 become compressed to the left side overall, while when the actual pulsation propagation speed becomes slower than the reference speed, the curves shown in FIG. 6 to FIG. 8 become expanded to the right side overall.

Therefore, to calculate the accurate amount of fluctuation of the main injection amount from the reference maps of FIG. 7 and FIG. 8, the amount of fluctuation of the main injection amount arising due to fluctuation of the parameters calculated from the reference maps of FIG. 6 to FIG. 8 based on the interval time should be corrected in accordance with the amount of deviation of the pulsation propagation speed from the reference speed. Therefore, in the above embodiment, the faster the actual pulsation propagation speed from the reference speed, the shorter the interval time from the actual interval time the amount of fluctuation of the main injection amount corresponding to is calculated from the reference maps of FIG. 6 to FIG. 8. On the slower the actual pulsation propagation speed from the reference speed, the longer the interval time from the actual interval time the amount of fluctuation of the main injection amount corresponding to is calculated from the reference maps of FIG. 6 to FIG. 8.

Further, when correcting the reference maps, the faster the actual pulsation propagation speed from the reference speed, the more compressed to the left side the relationships shown in FIG. 6 to FIG. 8 are corrected to. The amount of fluctuation of the main injection amount corresponding to the actual interval time is calculated based on the corrected relationships. On the other hand, the slower the actual pulsation propagation speed from the reference speed, the more expanded to the right the relationships shown in FIG. 6 to FIG. 8 are corrected to. The amount of fluctuation of the main injection amount corresponding to the actual interval time is calculated based on the corrected relationships.

In this way, the reference maps may be corrected or the amount of fluctuation of the main injection amount calculated from the reference maps may be corrected in accordance with the amount of deviation of the actual pulsation propagation speed from the reference speed. From this, if generally expressing correction based on the pulsation propagation speed, it can be said that the amount of fluctuation of the main injection amount calculated from the relationships shown in FIG. 6 to FIG. 8 is corrected in accordance with the pulsation propagation speed of that time.

Whatever the case, according to this, even if the actual pulsation propagation speed time deviates from the reference speed, the amount of fluctuation of the main injection amount can be accurately calculated.

Note that the pulsation propagation speed generally changes in accordance with the fuel pressure and the fuel temperature and becomes faster the higher the fuel pressure and slower the higher the fuel temperature. Therefore, in the above embodiment, the higher the average fuel pressure from a reference fuel pressure or the lower the fuel temperature from a reference fuel temperature, the shorter the interval time from the actual interval time the amount of fluctuation of the main injection amount corresponding to is calculated from the relationships shown in FIG. 6 to FIG. 8. On the other hand, it is also possible to design things so that the lower the average fuel pressure from a reference fuel pressure or the higher the fuel temperature from a reference fuel temperature, the longer the interval time from the actual interval time the amount of fluctuation of the main injection amount corresponding to is calculated from the relationships shown in FIG. 6 to FIG. 8.

Further, when correcting the reference maps, the higher the average fuel pressure from the reference fuel pressure or the lower the fuel temperature from the reference fuel temperature, the more compressed to the left side the relationships shown in FIG. 6 to FIG. 8 are corrected to. On the other hand, the lower the average fuel pressure from the reference fuel pressure or the higher the fuel temperature from the reference fuel temperature, the more expanded to the right side the relationships shown in FIG. 6 to FIG. 8 are corrected to. Further, it is also possible to calculate the amount of fluctuation of the main injection amount corresponding to the actual interval time based on the corrected relationships.

Further, in some cases, in the above embodiment, it is also possible to calculate the amount of fluctuation of the main injection amount corresponding to an interval time shorter than or longer than the actual interval time from the relationships shown in FIG. 6 to FIG. 8 based on either the amount of deviation of the average fuel pressure from the reference pressure or the amount of deviation of the fuel temperature from the reference fuel temperature. Further, it is also possible to correct the relationships shown in FIG. 6 to FIG. 8 and calculate the amount of fluctuation of the main injection amount corresponding to the actual interval time based on the corrected relationships.

In this way, it is possible to correct the reference maps or to correct the amount of fluctuation of the main injection amount calculated from the reference maps in accordance with both or either of the amount of deviation of the average fuel pressure from the reference fuel pressure and the amount of deviation of the fuel temperature from the reference fuel temperature. Therefore, if generally expressing correction based on the average fuel pressure and fuel temperature, it can be said that the amount of fluctuation of the main injection amount calculated from the relationships shown in FIG. 6 to FIG. 8 is corrected in accordance with at least one of the average fuel pressure and fuel temperature at that time.

Next, the method of correction of the reference maps or the method of correction of the amount of fluctuation of the main injection amount calculated from the reference maps when the average fuel pressure deviates from the reference pressure will be explained. The fuel injection amount in the main injection changes according to the average fuel pressure in the nozzle chamber 11 (this may also be the average fuel pressure in the common rail 2, hereinafter called the "average nozzle chamber pressure"). The higher the average nozzle chamber pressure, the greater the fuel injection amount at the main injection overall. Therefore, when the amount of fluctuation of the main injection amount calculated from the reference maps of FIG. 6 to FIG. 8 is a plus value, when the average nozzle chamber pressure is higher than a reference pressure, the amount of fluctuation of the main injection amount becomes larger by exactly the amount by which the average nozzle chamber pressure is higher than the reference pressure. Conversely, when the average nozzle chamber pressure is lower than the reference pressure, the amount of fluctuation of the main injection amount becomes smaller by exactly the amount by which the average nozzle chamber pressure is lower than the reference pressure. On the other hand, when the amount of fluctuation of the main injection amount calculated from the reference maps of FIG. 6 to FIG. 8 is a minus value, when the average nozzle chamber pressure is higher than a reference pressure, the amount of fluctuation of the main injection amount becomes smaller by exactly the amount by which the average nozzle chamber pressure is higher than the reference pressure. Conversely, when the average nozzle chamber pressure is lower than the reference pressure, the amount of fluctuation of the main injection amount becomes larger by exactly the amount by which the average nozzle chamber pressure is lower than the reference pressure.

Therefore, to calculate the accurate amount of fluctuation of the main injection amount from the reference maps of FIG. 6 to FIG. 8, the amount of fluctuation of the main injection amount arising due to fluctuation of the parameters calculated from the reference maps of FIG. 6 to FIG. 8 based on the interval time should be corrected in accordance with the amount of deviation of the actual average nozzle chamber pressure from the reference pressure. Therefore, in the above embodiment, when the amount of fluctuation of the main injection amount calculated from the reference maps of FIG. 6 to FIG. 8 is a plus value, the amount of fluctuation of the main injection amount calculated is made larger by exactly the amount by which the average nozzle chamber pressure is higher than the reference pressure. Alternatively, the amount of fluctuation of the main injection amount calculated is made smaller by exactly the amount by which the average nozzle chamber pressure is lower than the reference pressure. On the other hand, when the amount of fluctuation of the main injection amount calculated is a minus value, the amount of fluctuation of the main injection amount calculated is made smaller by exactly the amount by which the average nozzle chamber pressure is higher than the reference pressure or the amount of fluctuation of the main injection amount calculated is made larger by exactly the amount by which the average nozzle chamber pressure is lower than the reference pressure.

Further, when correcting the reference maps, the higher the average nozzle chamber pressure from the reference pressure, the more moved to the top side the relationships shown in FIG. 6 to FIG. 8 are corrected to. The amount of fluctuation of the main injection amount corresponding to the actual interval time is calculated based on the corrected relationships. On the other hand, the lower the average nozzle chamber pressure from the reference pressure, the more moved to the bottom side the relationships shown in FIG. 6 to FIG. 8 are corrected to. The amount of fluctuation of the main injection amount corresponding to the actual interval time is calculated based on the corrected relationships.

Figure 10:
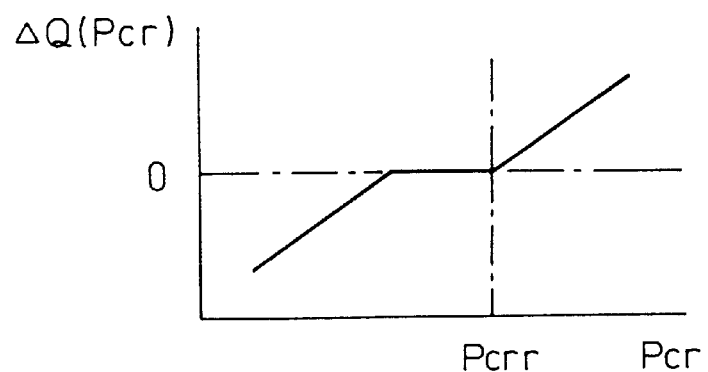
FIG. 10 shows the relationship between a rail pressure Pcr and an amount of fluctuation $\Delta Q(Pcr)$ of a main injection amount arising due to fluctuation in a rail pressure.

Further, when estimating the average fuel pressure in the nozzle chamber 11 from the average fuel pressure in the common rail 2 (average rail pressure), if it is known that the relationship between the average rail pressure and the amount of fluctuation of the main injection amount arising due to fluctuation in this average rail pressure becomes a relationship as shown in FIG. 10, the relationship such as shown in FIG. 10 is stored in advance in the form of a map and the amount of fluctuation $\Delta Q(Pcr)$ of the main injection amount arising due to fluctuation in the average rail pressure is calculated from this map and the average rail pressure Pcr. Further, it is also possible to make corrections to add this amount of fluctuation $\Delta Q(Pcr)$ to the amount of fluctuation of the main injection amount estimated from the relationships shown in FIG. 6 to FIG. 8.

As explained above, the reference maps may be corrected or the amount of fluctuation of the main injection amount calculated from the reference maps may be corrected in accordance with the amount of deviation of the actual average fuel pressure from the reference pressure. From this, if generally expressing correction based on the average fuel pressure, it can be said that the amount of fluctuation of the main injection amount calculated from the relationships shown in FIG. 6 to FIG. 8 is corrected in accordance with the average fuel pressure at that time.

Whatever the case, according to this, even if the actual average fuel pressure deviates from the reference pressure, the amount of fluctuation of the main injection amount can be accurately calculated.

Note that in the relationship shown in FIG. 10, the amount of fluctuation $\Delta Q(Pcr)$ of the main injection amount is zero when the average rail pressure Pcr is at a pressure serving as the reference value and that the average rail pressure Pcr becomes greater the higher from the reference pressure Pcrr. On the other hand, when the average rail pressure Pcr becomes lower than the reference pressure Pcrr, the average rail pressure Pcr is substantially zero until less than a certain pressure, but the average rail pressure Pcr gradually becomes smaller when becoming lower than that.

Further, as explained above, the pulsation is reflected at the common rail 2 and returns to the fuel injector 1, so the relationships shown in FIG. 6 to FIG. 8 fluctuate in accordance with the distance of the path through which the fuel flows from the nozzle chamber 11 to the common rail 2 (hereinafter called simply the "fuel path"). The longer the distance of the fuel path, the more the curves shown in FIG. 6 to FIG. 8 are moved to the right side overall. In other words, if considering the interval times where the amounts of fluctuation of the main injection amount become the same value, the longer the distance of the fuel path from the nozzle chamber 11 to the common rail 2, the longer the interval time corresponding to the same amount of fluctuation of the main injection amount. Therefore, in the above embodiment, the relationships shown in FIG. 6 to FIG. 8 become relationships considering the distance of the fuel path from the nozzle chamber 11 to the common rail 2.

Next, the method of calculation or the method of detection of the pulsation propagation speed will be explained. As explained above, the pulsation propagation speed changes according to the fuel pressure and the fuel temperature. Therefore, in the above embodiment, for example, a formula for finding the pulsation propagation speed based on the fuel pressure and the fuel temperature is found in advance and stored. The pulsation propagation speed is calculated from this formula based on the fuel pressure (the fuel pressure used here is the fuel pressure when the fluctuation in the fuel pressure arising due to pulsation is zero, that is, the average fuel pressure) and the fuel temperature.

Further, it is also possible to calculate the pulsation propagation speed from the time from when a control signal for causing the pilot injection is emitted to the fuel injector 1 to when a fluctuation in pressure is detected by the pressure sensor 6 (or the time from when pilot injection is actually performed to when a fluctuation in pressure is detected by the pressure sensor 6) and the distance of the fuel path from the nozzle chamber 11 to the pressure sensor 6.

Note that in this case, it is possible to judge from the timing at which the pressure fluctuation is detected by the pressure sensor 6 which fuel injector that pressure fluctuation occurred at. When calculating the pulsation propagation speed from the pressure fluctuation detected by the pressure sensor 6 in the above way, it is also possible to calculate the pulsation propagation speed in accordance with each fuel injector. However, the pulsation propagation speed is almost the same for the fuel injectors. With this in mind, from the viewpoint of reducing the load for calculating the pulsation propagation speed (so called calculation load), it is also possible to calculate the pulsation propagation speed for only one fuel injector (for example, for only the fuel injector with the longest distance of the fuel path from the nozzle chamber 11 to the pressure sensor 6).

Further, when calculating the pulsation propagation speed for the fuel injector with the longest distance of the fuel path from the nozzle chamber 11 to the pressure sensor 6, there is the advantage that a more accurate propagation speed is calculated. That is, when the pulsation propagation speed is V, the distance of the fuel path from the nozzle chamber 11 to the pressure sensor 6 is L, the time from when the control signal for causing the pilot injection is emitted to the fuel injector 1 to when a pressure fluctuation is detected by the pressure sensor 6 is T, and the error with respect to the time T obtained from the pressure sensor 6 is $\pm\Delta T$, the pulsation propagation speed is found from the following equation (4):

$$V = L/(T \pm \Delta T) \tag{4}$$

Referring to equation (4), the larger the time T, the smaller the degree of effect of the error $\pm\Delta T$ on the time T. It is learned that a more accurate pulsation propagation speed V is obtained from the above equation (4). That is, when calculating the pulsation propagation speed for the fuel injector with the longest distance of the fuel path from the nozzle chamber 1 to the pressure sensor 6, the time T becomes larger compared with the case of calculating the pulsation propagation speed for other fuel injectors, so a more accurate pulsation propagation speed is obtained.

Figure 11:
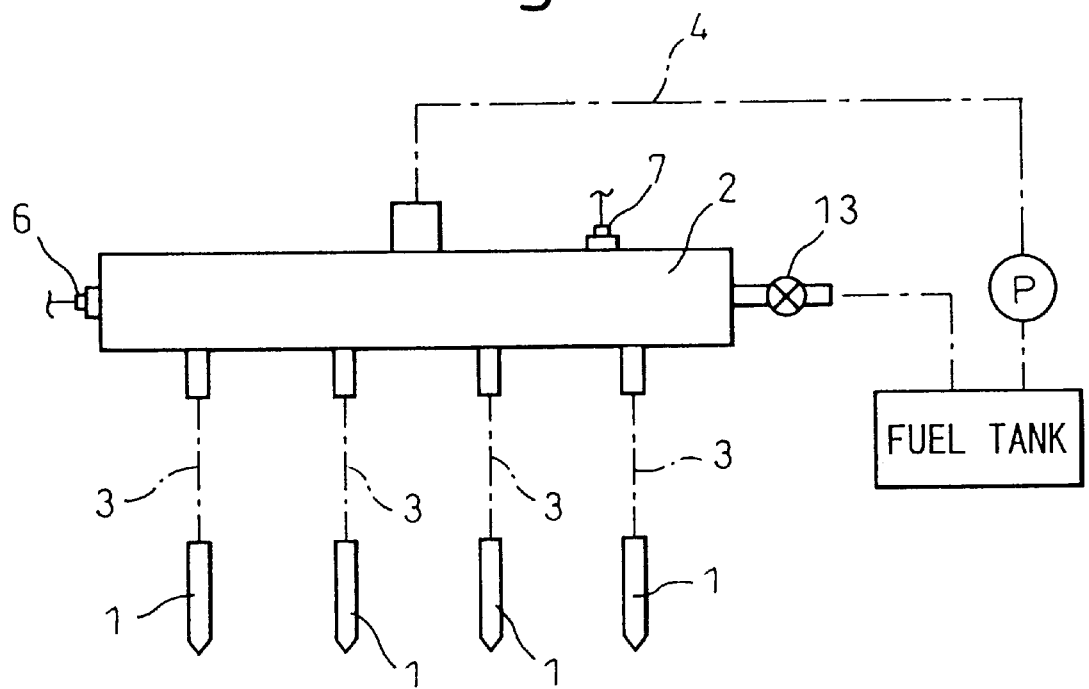
FIG. 11 shows a common rail of an embodiment.

Further, in some cases the pulsations occurring at the different fuel injectors 1 end up complicatedly overlapping in the common rail 2 and the pulsation propagation speed cannot be accurately calculated. The method of calculating the pulsation propagation speed in this case will be explained next. As shown in FIG. 11, a pressure reduction valve 13 for returning the fuel in the common rail 2 from there to the fuel tank to reduce the pressure in the common rail 2 when the amount of depression of the accelerator pedal becomes zero and the required load becomes extremely small is provided at a position of the common rail 2 at the opposite side to the pressure sensor 6. Further, when the amount of depression of the accelerator pedal becomes zero and a pressure reduction valve 13 opens, the pulsation propagation speed is calculated from time from when the pressure reduction valve 13 opens to when the pressure fluctuation arising due to opening of the pressure reduction valve 13 is detected by the pressure sensor 6 and the distance from the pressure reduction valve 13 to the pressure sensor 6. Further, it is also possible to calculate from the relationships shown in FIG. 6 to FIG. 8 the amount of fluctuation of the main injection amount corresponding to the shorter interval time from the actual interval time the faster the calculated pulsation propagation speed from the reference speed.

According to this, even when the pulsations occurring at the different fuel injectors 1 end up complicatedly overlapping in the common rail 2 and normally the pulsation propagation speed cannot be accurately calculated, it is possible to accurately calculate the pulsation propagation speed. Therefore, it is possible to reliably cause the target amount of fuel to be injected from a fuel injector 1.

Note that the pulsation propagation speed may also be calculated uninterruptedly. However, to lighten the load of calculation of the pulsation propagation speed (calculation load), it is also possible to for example calculate the pulsation propagation speed once when the internal combustion engine is started and then calculate the pulsation propagation speed each time a predetermined time interval elapses.

Further, if the rate of change of the fuel temperature per unit time is large, the rate of change of the pulsation propagation speed per unit time is also large, so from the viewpoint of accurately calculating the amount of fluctuation of the main injection amount, it is preferable to calculate the pulsation propagation speed as often as possible. Therefore, in the above embodiment, the larger the rate of change of the fuel temperature per unit time, the shorter the above predetermined time interval for determining the timing for calculating the pulsation propagation speed is made.

Conversely, it is also possible to make the predetermined time interval longer the smaller the rate of change of the fuel temperature per unit time. According to this, even if the fuel temperature changes greatly, the amount of fluctuation of the main injection amount is accurately calculated.

In the above, however, it was explained that since when the rate of change of the fuel temperature per unit time is large, the rate of change per unit time of the pulsation propagation speed is also large, so it is preferable to calculate the pulsation propagation speed as often as possible. Here, even when the rate of change of the average fuel pressure per unit time is larger, the rate of change of the pulsation propagation speed per unit time is also large. Therefore, from the viewpoint of accurately calculating the amount of fluctuation of the main injection amount, it may also be considered preferable to calculate the pulsation propagation speed when the rate of change of the average fuel pressure per unit time is large. However, the fuel temperature only changes in a certain direction (direction becoming higher or direction becoming lower) and does not rise and fall by a large amount in a short time much at all. On the other hand, the average fuel pressure sometimes increases and decreases by a relatively large extent. In this case, it is not possible to accurately calculate the pulsation propagation speed. Therefore, from the viewpoint of accurately calculating the amount of fluctuation of the main injection amount, it is preferable to calculate the pulsation propagation speed when the rate of change of the average fuel pressure per unit time is small. Accordingly, in the above embodiment, it is also possible to calculate the pulsation propagation speed when the rate of change of the average fuel pressure per unit time is smaller than a predetermined rate of change (that is, when the extent of change of the average fuel pressure is smaller than a predetermined extent).

Note that in the above embodiment, when for example the driver would not be made to feel too strange even if forcibly changing the average fuel pressure such as at the time of deceleration of the internal combustion engine, the average fuel pressure is forcibly changed and made a plurality of different values and the actual pulsation propagation speed is detected using the values measured from the pressure sensor at the different average fuel pressures. Further, it is also possible to find the relationship between the average fuel pressure and the pulsation propagation speed based on these detected values. According to this, it is possible to calculate the pulsation propagation speed based on the relationship found in this way.

If generally expressing calculation of the pulsation propagation speed explained above, it can be said that the pulsation propagation speed is calculated when predetermined conditions are established.

Note that the above embodiment was predicated on the pulsation propagation speed becoming the reference speed when the average fuel pressure is the reference pressure and the fuel temperature is the reference temperature. However, when the properties of the fuel differ from the scheduled properties, the pulsation propagation speed may not necessarily become the reference speed even if the average fuel pressure is the reference pressure and the fuel temperature is the reference temperature. Therefore, when correcting the reference maps or correcting the amount of fluctuation of the main injection amount calculated from the reference maps based on the amount of deviation between the pulsation propagation speed calculated based on the average fuel pressure and fuel pressure and the reference speed, it is not necessarily possible to accurately calculate the amount of fluctuation of the main injection amount if the properties of the fuel differ from the scheduled properties.

Therefore, in the above embodiment, it is also possible to calculate the pulsation propagation speed by a method other than the method of calculating the pulsation propagation speed based on the average fuel pressure and fuel temperature when the average fuel pressure is the reference pressure and the fuel temperature is the reference temperature and to use the calculated pulsation propagation speed to update the reference speed. According to this, even when the properties of the fuel differ from the scheduled properties, it is possible to accurately calculate the amount of fluctuation of the main injection amount.

Note that in the above embodiment, the pressure sensor 6 is mounted at the common rail 2, but it may also be mounted at the fuel feed passage 3 or the nozzle chamber 11. Further, in the above embodiment, the temperature sensor 7 is mounted at the common rail 2, but it may also be mounted at the fuel pump P.

Further, in the above embodiment, when using the pressure fluctuation detected by the pressure sensor 6 for calculating the pulsation propagation speed, it is also possible to attach pressure sensors at each of the two ends of the common rail 2, the common rail 2 and the fuel injector 1, a position near the nozzle chamber 11 of the fuel injector 1 and a position of the fuel injector 1 where the fuel feed passage 3 is connected, the common rail 2 and fuel feed passage 3, or the fuel injector 1 and the fuel feed passage 3 and calculate the pulsation propagation speed from the difference in time until a pressure fluctuation is detected by these two pressure sensors and the distance of the fuel path between these two pressure sensors.

Further, in the above embodiment, when using the fuel temperature detected by a temperature sensor for calculating the pulsation propagation speed, if the effect of the heat emitted from the engine body 1 reaches the temperature sensor, it is not possible to detect the accurate fuel temperature by the temperature sensor. Therefore, since it is not possible to calculate the accurate pulsation propagation speed, the temperature sensor may also be insulated from the heat emitted from the engine body 1 by an insulating material etc.

Note that when the internal combustion engine is designed to inject fuel consecutively three or more times in one engine cycle, it is possible to use the above embodiment to make the fuel injector 1 inject the target amount of fuel in each fuel injection. For example, when the internal combustion engine is designed to inject fuel consecutively three times in one engine cycle, it is possible to control a control value relating to the operation of the fuel injector 1 in the following way so that the target amount of fuel is injected from the fuel injector 1. That is, the amount of fluctuation of the fuel injection amount in the second fuel injection arising due to fluctuation in the above parameters arising due to pulsation occurring due to the first fuel injection is estimated from the reference maps of FIG. 6 to FIG. 8 based on the interval time between the first fuel injection and the second fuel injection. Further, the control value relating to the operation of the fuel injector 1 is controlled so that the target amount of fuel is injected from the fuel injector 1 in the second fuel injection based on this amount of fluctuation.

Further, the amount of fluctuation of the fuel injection amount in the third fuel injection arising due to fluctuation in the above parameters arising due to pulsation occurring due to the first fuel injection is estimated from the reference maps of FIG. 6 to FIG. 8 based on the interval time between the first fuel injection and the third fuel injection. Further, the amount of fluctuation of the fuel injection amount in the third fuel injection arising due to fluctuation in the above parameters arising due to pulsation occurring due to the second fuel injection is estimated from the reference maps of FIG. 6 to FIG. 8 based on the interval time between the second fuel injection and the third fuel injection. Further, the value of these estimated amounts of fluctuation of the fuel injection amounts added together is used as the amount of fluctuation of the fuel injection amount at the third fuel injection, and a control value relating to the operation of the fuel injector 1 is controlled based on this amount of fluctuation so that the target amount of fuel is injected from the fuel injector 1 at the third fuel injection. According to this, even if fuel is later injected a plurality of times in one engine cycle while fuel in a fuel injector 1 is pulsating, it is possible to make the target amount of fuel be injected from the fuel injector 1 at each fuel injection.

Figure 12:
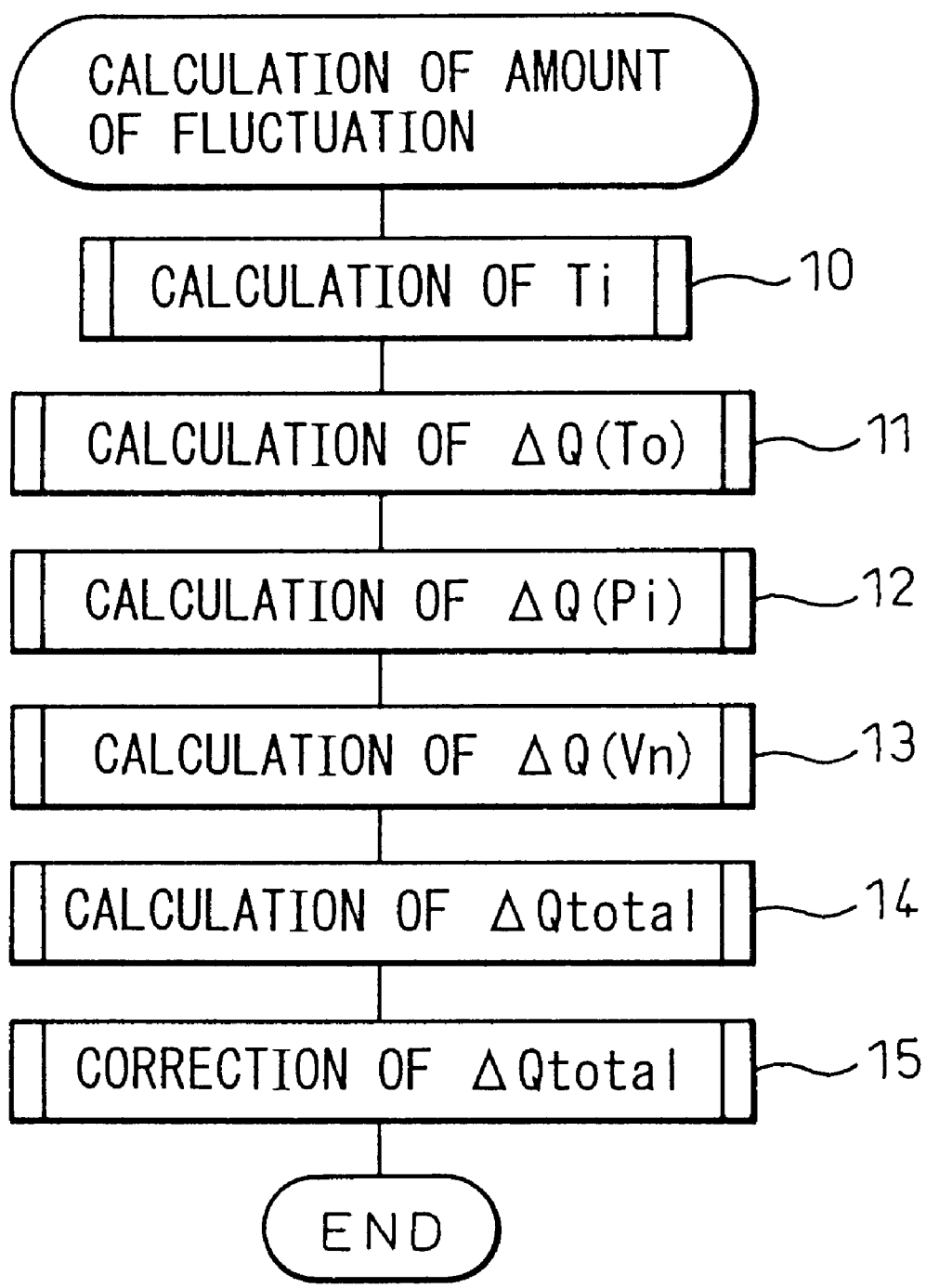
FIG. 12 shows a flow chart of a routine for calculating an amount of fluctuation of a main injection amount.

Next, an example of the method of calculation of the amount of fluctuation of the main injection amount in accordance with the above embodiment will be explained with reference to FIG. 12 to FIG. 20B. FIG. 12 is a flow chart of the routine for calculating the amount of fluctuation of the main injection amount arising due to pulsation of fuel. In the routine of FIG. 12, first, at step 10, the interval time Ti is calculated in accordance with the routine shown in FIG. 13. Next, at step 11, the amount of fluctuation $\Delta Q(To)$ of the main injection amount arising due to fluctuation of the main injection timing arising due to pulsation of the fuel is calculated in accordance with the routine shown in FIG. 15. Next, at step 12, the amount of fluctuation $\Delta Q(Pi)$ of the main injection amount arising due to fluctuation of the fuel injection pressure arising due pulsation of the fuel is calculated in accordance with the routine shown in FIG. 17. Next, at step 13, the amount of fluctuation $\Delta Q(Vn)$ of the main injection amount arising due to fluctuation of the main injection needle speed arising due to pulsation of the fuel is calculated in accordance with the routine shown in FIG. 19.

Next, at step 14, the total amount of fluctuation $\Delta Q$total of the main injection amount is calculated by totaling the amounts of fluctuation of the main injection amount calculated at step 11 to step 13. Next, at step 15, the total amount of fluctuation $\Delta Q$total calculated at step 14 is corrected based on the average fuel pressure in the common rail 2 (average rail pressure).

Figure 13:
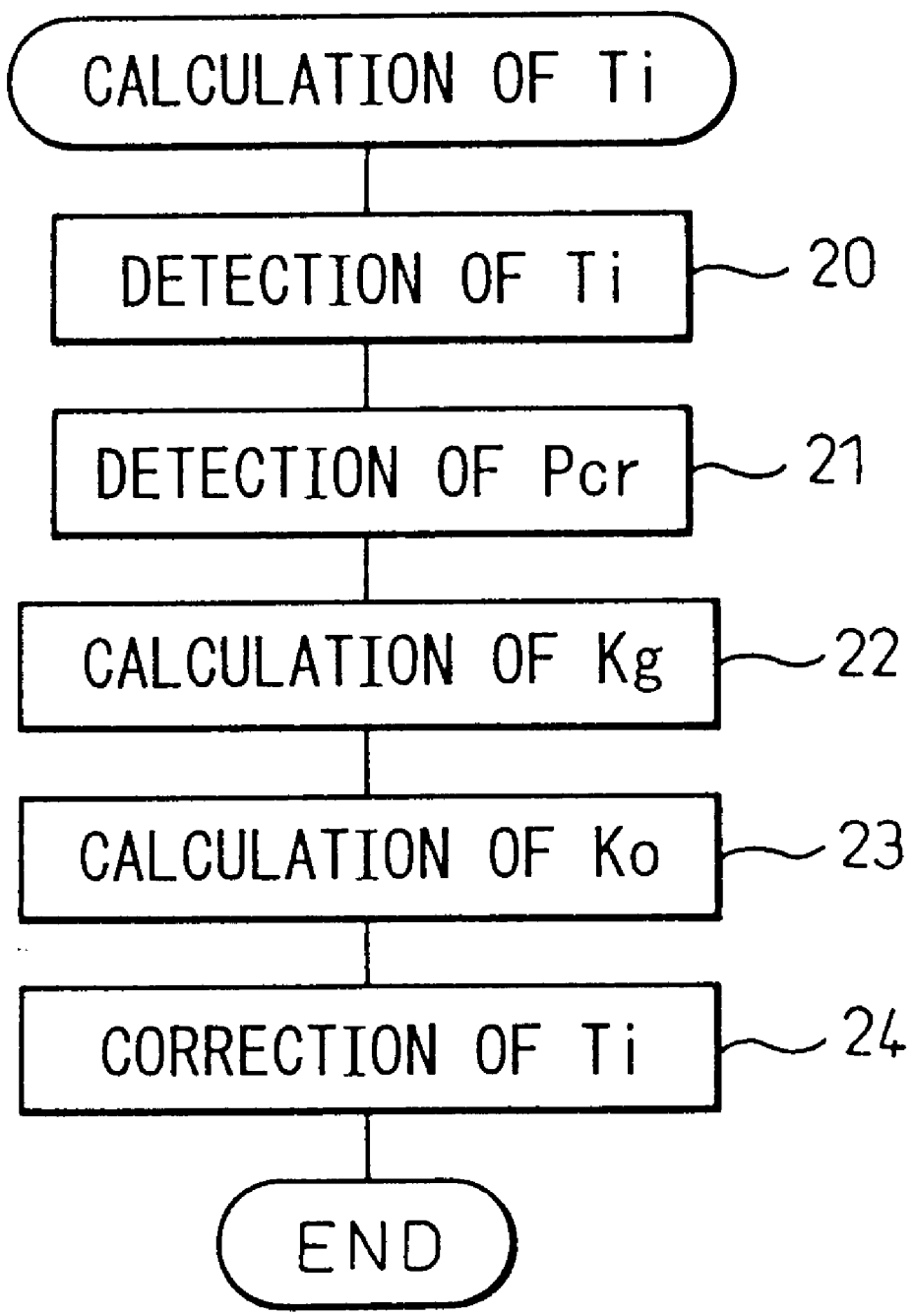
FIG. 13 shows a flow chart of a routine for calculating an interval time Ti.

FIG. 13 is a flow chart of the routine for calculation of the interval time. This routine is a routine executed at step 10 of FIG. 12. In the routine of FIG. 13, first, at step 20, the interval time Ti is detected. Next, at step 21, the average rail pressure Pcr is detected. Next, at step 22, the gain coefficient Kg is calculated from the map of FIG. 14A based on the average rail pressure Pcr. Here, in the map of FIG. 14A, when the average rail pressure Pcr is the pressure serving as the reference, the gain coefficient Kg becomes 1.0.

Figure 14A:
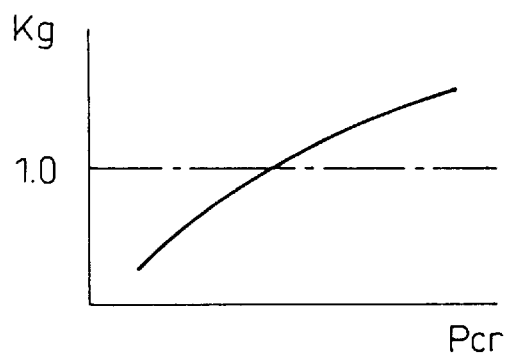
FIG. 14A shows the relationship between a rail pressure Pcr and a gain coefficient Kg as a map to be used in the routine of FIG. 13.
Figure 14B:
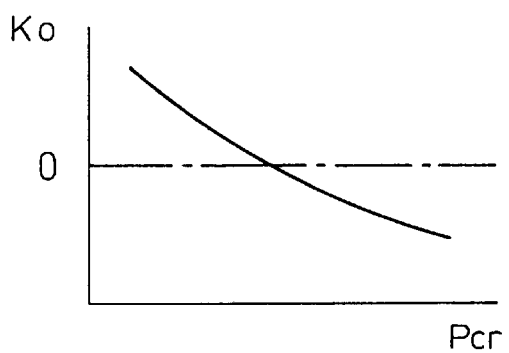
FIG. 14B shows the relationship between a rail pressure Pcr and an offset coefficient Ko as a map to be used in the routine of FIG. 13.

Further, at step 23, the offset coefficient Ko is calculated from the map of FIG. 14B based on the average rail pressure Pcr. Here, in the map of FIG. 14B, when the average rail pressure Pcr is the reference pressure, the offset coefficient K0 becomes 0. Further, at step 24, the interval time Ti is corrected based on the gain coefficient Kg and the offset coefficient Ko. In more detail, the interval time Ti is multiplied with the gain coefficient Kg, then the offset coefficient Ko is added so as to correct the interval time Ti.

Figure 15:
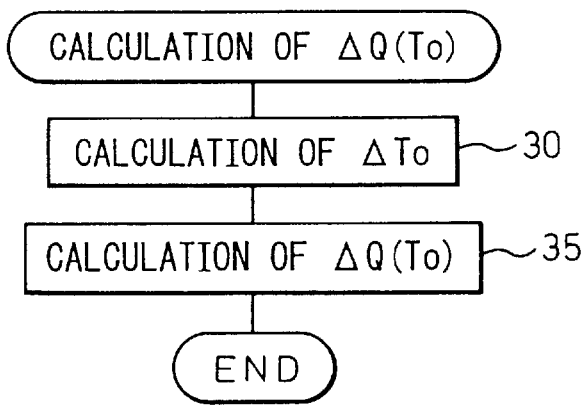
FIG. 15 shows a flow chart of a routine for calculating an amount of fluctuation $\Delta Q(To)$ of a main injection amount arising due to fluctuation in an opening timing of a fuel injector.
Figure 16:
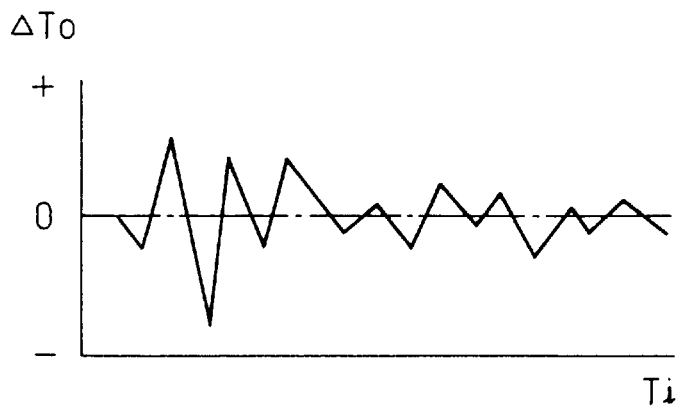
FIG. 16 shows the relationship between an interval time Ti and amount of fluctuation $\Delta To$ of the opening timing of a fuel injector as a map to be used in the routine of FIG. 15.

FIG. 15 is a flow chart of the routine for calculation of the amount of fluctuation of the main injection amount arising due to fluctuation of the main injection timing arising due to pulsation of the fuel. This routine is a routine executed at step 11 of FIG. 12. In the routine of FIG. 15, first, at step 30, the amount of fluctuation $\Delta To$ of the main injection timing is calculated from the map of FIG. 16 based on the interval time Ti. Next, at step 35, the amount of fluctuation $\Delta Q(To)$ of the main injection amount arising due to fluctuation of the main injection timing is calculated based on the amount of fluctuation $\Delta To$ of the main injection timing calculated at step 30.

Figure 17:
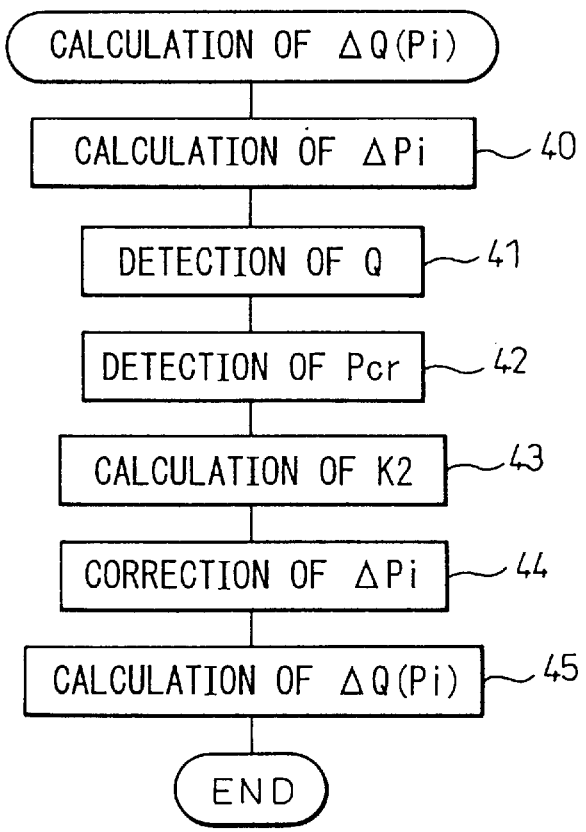
FIG. 17 shows a flow chart of a routine for calculating an amount of fluctuation $\Delta Q(Pi)$ of a main injection amount arising due to fluctuation in a fuel injection pressure.

FIG. 17 is a flow chart of the routine for calculation of the amount of fluctuation of the main injection amount arising due to fluctuation of the fuel injection pressure arising due to pulsation of the fuel. This routine is the routine executed at step 12 of FIG. 12. In the routine of FIG. 17, first, at step 40, the amount of fluctuation $\Delta Pi$ of the fuel injection pressure is calculated from the map of FIG. 18A based on the interval time Ti. Next, at step 41, the main injection amount Q is detected. Next, at step 42, the average rail pressure Pcr is detected.

Figure 18A:
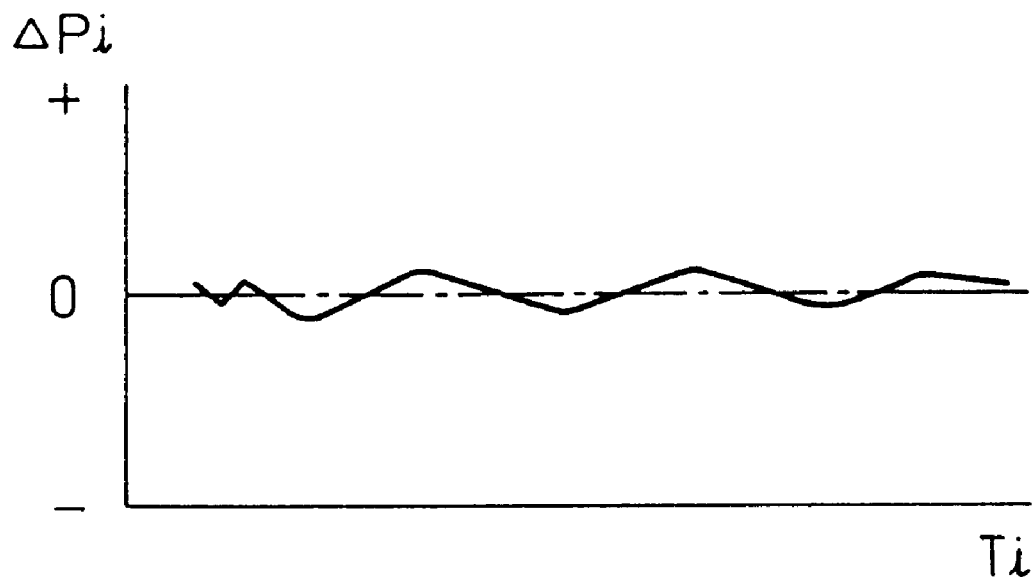
FIG. 18A shows the relationship between an interval time Ti and an amount of fluctuation $\Delta Pi$ of a fuel injection pressure as a map to be used in the routine of FIG. 17.
Figure 18B:
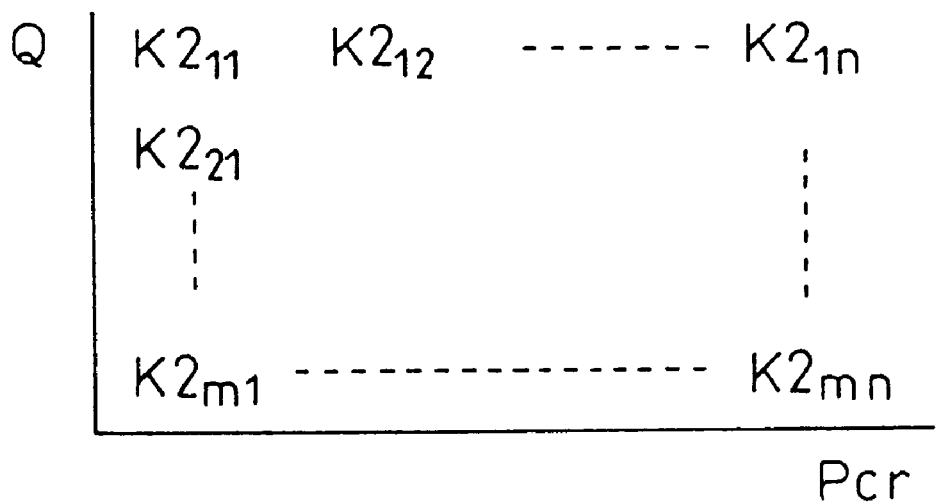
FIG. 18B shows the relationship between a rail pressure Pcr and a total fuel injection amount Q as a map to be used in the routine of FIG. 17.

Next, at step 43, the correction coefficient K2 is calculated from the map of FIG. 18B based on the average rail pressure Pcr and the main injection amount Q. Here, the map of FIG. 18A is a map showing the relationship standing between the interval time Ti and the amount of fluctuation $\Delta Pi$ of the fuel injection pressure when the average rail pressure Pcr is the reference pressure and the main injection amount Q is a certain reference amount. Therefore, when the average rail pressure Pcr differs from the reference pressure or the main injection amount Q differs from the reference amount, to obtain the accurate amount of fluctuation $\Delta Pi$ of the fuel injection pressure, the amount of fluctuation $\Delta Pi$ of the fuel injection pressure calculated from the map of FIG. 18A should be corrected in accordance with the actual average rail pressure Pcr or the actual main injection amount Q. The correction coefficient K2 calculated at step 43, in view of this situation, is a coefficient calculated and used to obtain the accurate amount of fluctuation $\Delta Pi$ of the fuel injection pressure.

Next, at step 44, the amount of fluctuation $\Delta Pi$ of the fuel injection pressure is corrected based on the correction coefficient K2. In more detail, the amount of fluctuation $\Delta Pi$ of the fuel injection pressure is multiplied with the correction coefficient K2 to correct the amount of fluctuation $\Delta Pi$ of the fuel injection pressure. Finally, at step 45, the amount of fluctuation $\Delta Q(Pi)$ of the main injection amount arising due to the fluctuation of the fuel injection pressure is calculated based on the amount of fluctuation $\Delta Pi$ of the fuel injection pressure corrected at step 44.

Figure 19:
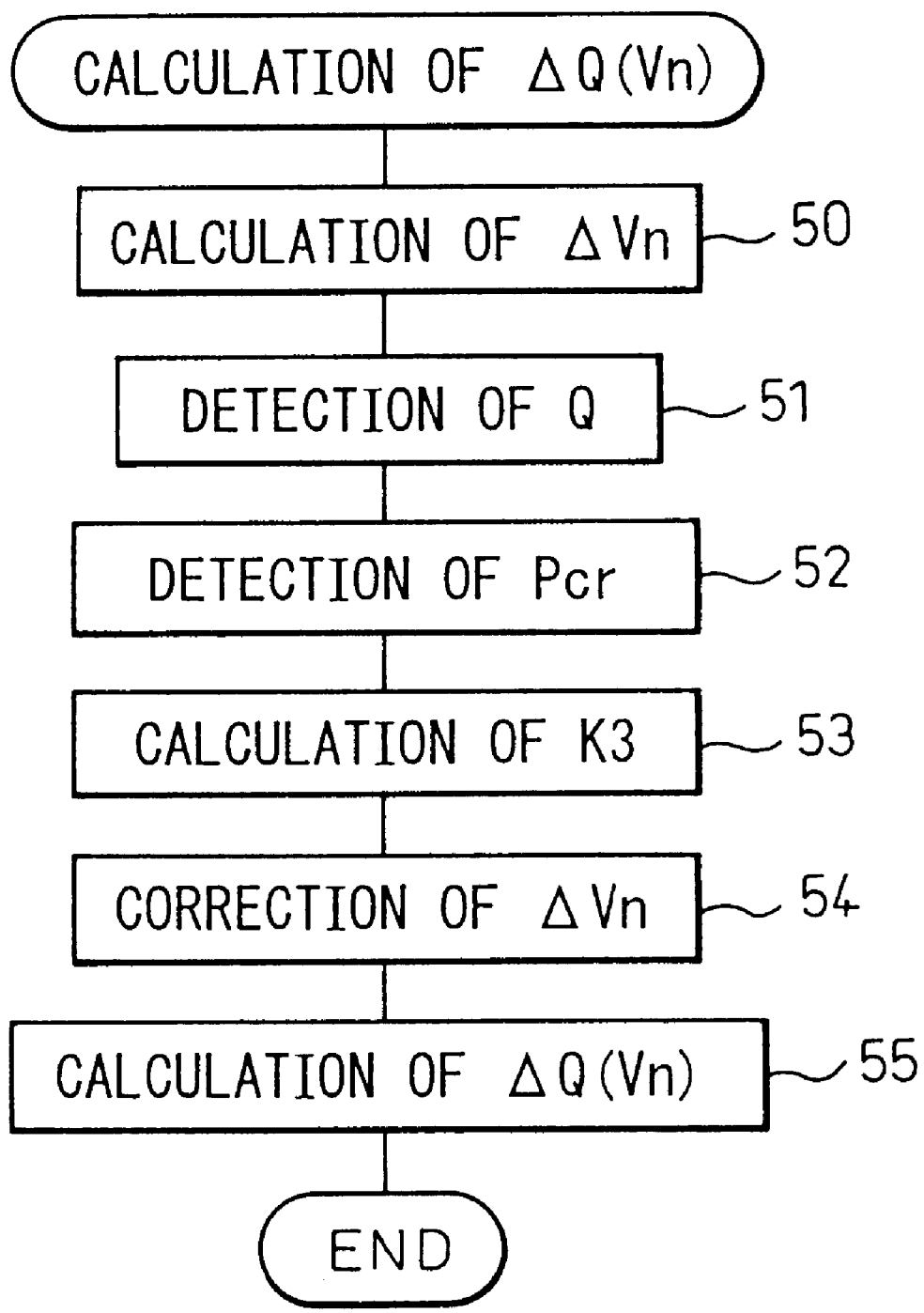
FIG. 19 shows a flow chart of a routine for calculating an amount of fluctuation $\Delta Q(Vn)$ of a main injection amount arising due to fluctuation in an opening speed of a fuel injector.

FIG. 19 is a flow chart of the routine for calculation of the amount of fluctuation of the main injection amount arising due to fluctuation of the main injection needle speed arising due to pulsation of the fuel. This routine is the routine executed at step 13 of FIG. 12. In the routine of FIG. 19, first, at step 50, the amount of fluctuation $\Delta Vn$ of the main injection needle speed is calculated from the map of FIG. 20A based on the interval time Ti. Next, at step 51, the main injection amount Q is detected. Next, at step 52, the average rail pressure Pcr is detected.

Figure 20A:
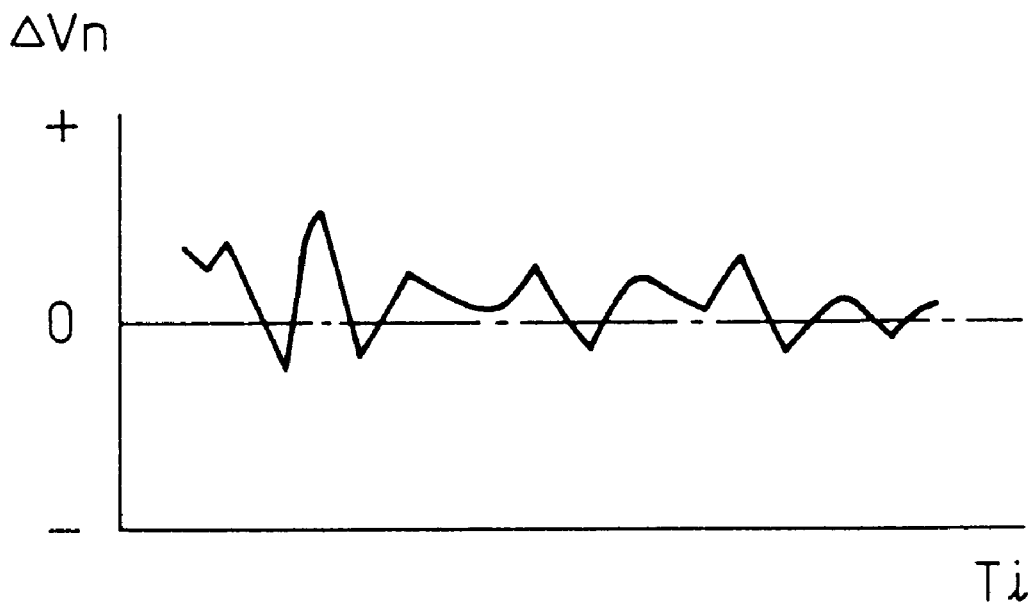
FIG. 20A shows the relationship between an interval time Ti and an amount of fluctuation $\Delta Vn$ of an opening speed of a fuel injector as a map to be used in the routine of FIG. 19.
Figure 20B:
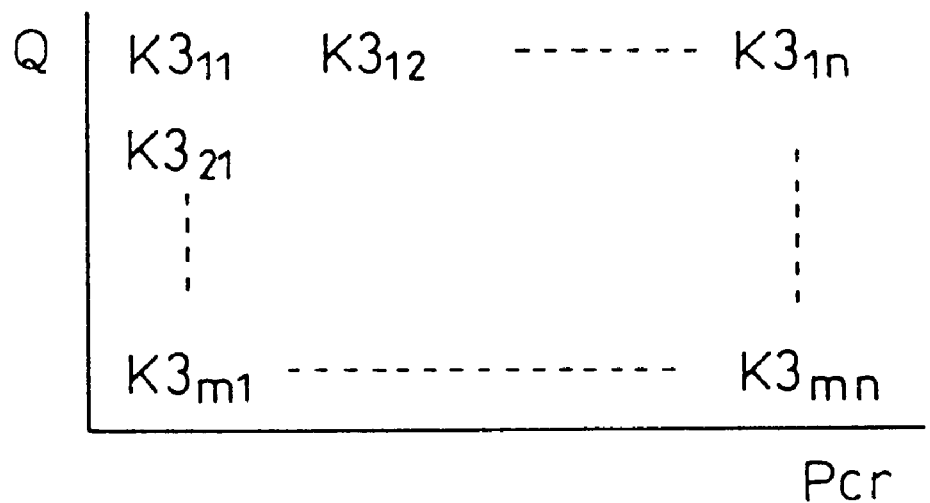
FIG. 20B shows the relationship between a rail pressure Pcr and a total fuel injection amount Q as a map to be used in the routine of FIG. 19.

Next, at step 53, the correction coefficient K3 is calculated from the map of FIG. 20B based on the average rail pressure Pcr and main injection amount Q. Here, the map of FIG. 20A is a map showing the relationship standing between the interval time Ti and the amount of fluctuation $\Delta Vn$ of the main injection needle speed when the average rail pressure Pcr is the reference pressure and the main injection amount Q is the reference amount. Therefore, when the average rail pressure Pcr differs from the reference pressure or the main injection amount Q differs from the reference amount, to obtain the accurate amount of fluctuation ΔVn of the main injection needle speed, the amount of fluctuation ΔVn of the main injection needle speed calculated from the map of FIG. 20A should be corrected in accordance with the actual average rail pressure Pcr or actual main injection amount Q. The correction coefficient K3 calculated at step 53, in view of this situation, is a coefficient calculated and used to obtain the accurate amount of fluctuation ΔVn of the main injection needle speed.

Next, at step 54, the amount of fluctuation ΔVn of the main injection needle speed is corrected based on the correction coefficient K3. In more detail, the amount of fluctuation ΔVn of the main injection needle speed is multiplied with the correction coefficient K3 to correct the amount of fluctuation ΔVn of the main injection needle speed. Finally, at step 55, the amount of fluctuation ΔQ(Vn) of the main injection amount arising due to the fluctuation of the main injection needle pressure is calculated based on the amount of fluctuation ΔVn of the main injection needle speed corrected at step 54.

Note that in the above embodiment, three parameters are employed to calculate the amount of fluctuation of the main injection amount arising due to pulsation of the fuel. However, when certain specific conditions stand, there will be parameters among these three parameters where the effect on the fuel injection amount becomes extremely small. In this case, by not employing a parameter with the extremely small effect on the fuel injection amount, the load for calculating the amount of fluctuation of the main injection amount (calculation load) becomes smaller. In some cases, the correction speed of a control value relating to the operation of the fuel injector 1 becomes slower by the amount by which the calculation load becomes smaller, so conversely it is possible to make the fuel injection amount the target amount more precisely.

For example, it is learned that when the main injection time is relatively short, fluctuation in the fuel injection pressure or main injection needle speed does not have that much of an effect on the fuel injection amount. Therefore, in the above embodiment, when the condition of the main injection time being relatively short stands, it is also possible to employ only the main injection timing as a parameter. According to this, the load for calculating the amount of fluctuation of the main injection amount (calculation load) becomes smaller and in some cases it is possible to make the fuel injection amount the target amount more accurately.

Note that in the above embodiment, the amount of fluctuation of the main injection amount arising due to fluctuation in the opening timing is calculated and a control value relating to operation of the fuel injector 1 (hereinafter called an "operational control value") is controlled based on this amount of fluctuation. However, it is also possible to directly control the operational control value based on the amount of fluctuation of the opening timing. For example, it is also possible to control the operational control value so that the opening timing in the main injection becomes the timing where the amount of fluctuation is zero (hereinafter called the "reference timing"). An embodiment of control in this case will be explained in detail with reference to FIG. 21A to FIG. 22B.

Figure 21A:
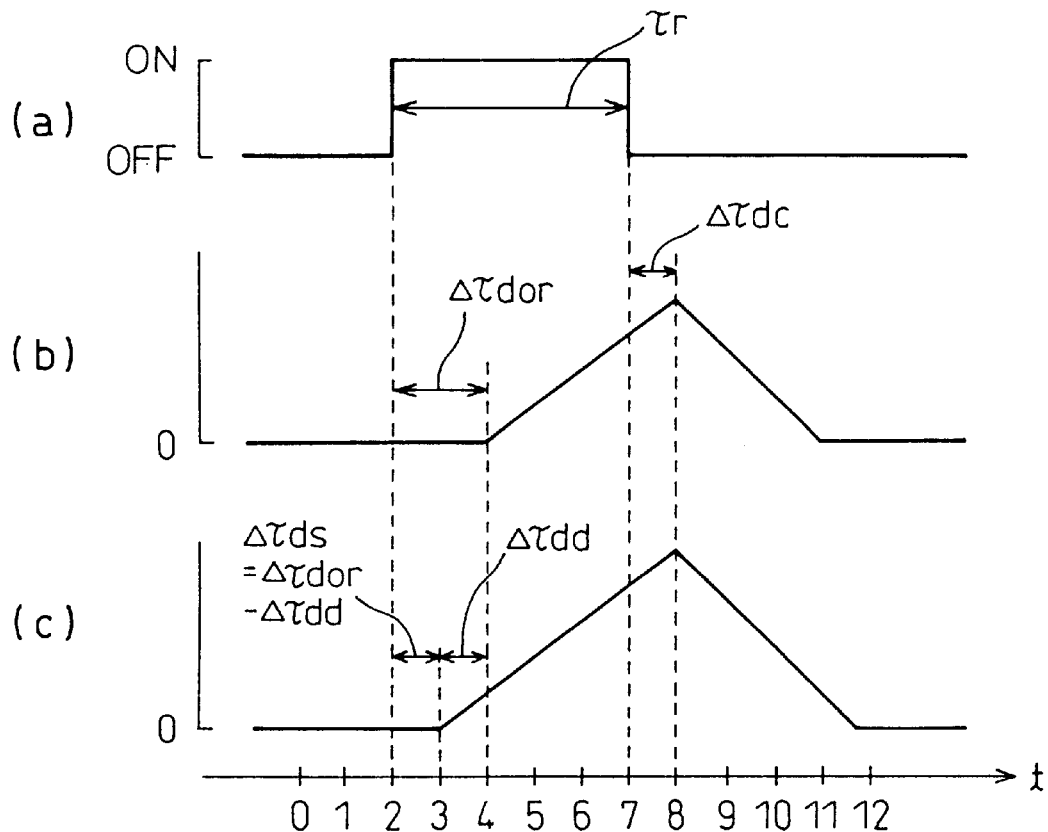
FIG. 21A and FIG. 21B show an example of control for correcting an opening timing in the case where the opening timing becomes advanced due to the effect of pulsation.

(a) of FIG. 21A shows the trend in a control signal transmitted to the fuel injector 1 for making the fuel injector 1 open (hereinafter simply called the "opening command signal"), (b) shows the trend in the lift of the needle valve 8 in the case where there is no effect of pulsation (hereinafter simply called the "lift"), and (c) shows the trend of the lift in the case where the opening timing in the main injection becomes earlier due to the effect of pulsation. Further, (a) of FIG. 21B shows the trend of the opening command signal in the case where the operational control value is corrected, while (b) shows the trend in the lift in the case where the operational control value is corrected as shown in (a).

As shown in (a) of FIG. 21A, an opening command signal is emitted at the time t2. When there is no effect of pulsation, as shown in (b) of FIG. 21A, the needle valve 8 starts to open at the time t4 delayed by exactly a certain delay time Δτdor. Further, when emission of the opening command signal is stopped at the time t7, the needle valve 8 starts to close at the time t8 delayed by exactly a certain delay time Δτdc.

On the other hand, when the opening timing in the main injection becomes earlier due to the effect of pulsation, as shown by (c) in FIG. 21A, the needle valve 8 starts to open at the time t3 delayed by exactly the time Δτds (=Δτdor−Δτdd) shorter than the certain delay time Δτdor by exactly the time Δτdd. That is, the opening timing becomes earlier by exactly the time Δτdd. Further, when the emission of the opening command signal is stopped at the time t7, the needle valve 8 starts to close at the time t8 delayed by exactly the same delay time Δτdc as the delay time in the case of no effect of pulsation. In this case, the opening time of the fuel injector 1 becomes longer than the case of no effect of pulsation, so the fuel injection amount ends up becoming greater than the target amount.

Figure 21B:
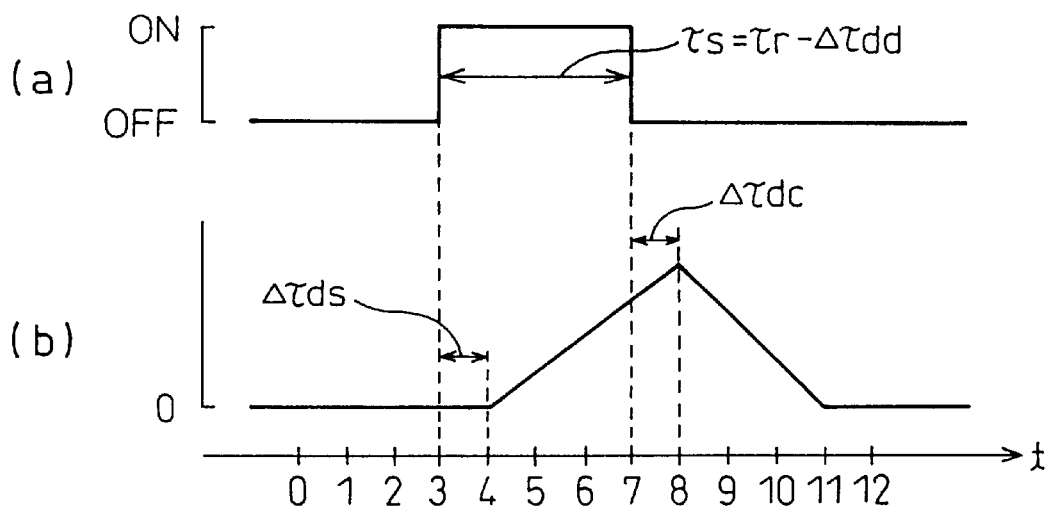

Therefore, in this case, in the present embodiment, the timing of emission of the opening command signal is delayed by exactly the amount by which the opening timing becomes earlier (above-mentioned time Δτdd) and made the time t3 as shown in (a) of FIG. 21B. In this case, the needle valve 8 starts to open at the time t4 delayed by exactly the time Δτds (=Δτdor−Δτdd) as shown in (b) of FIG. 21B. That is, the opening timing becomes the same as the opening timing in the case of no effect of pulsation. Further, when the emission of the opening command signal is stopped at the time t7 (time same as emission stopping time of opening command signal in the case of no effect of pulsation), the needle valve 8 starts to close at the same time t8 as the closing timing in the case of no effect of pulsation. According to this, the opening timing of the fuel injector 1 becomes the same as the case of no effect of pulsation, so the fuel injection amount becomes the target amount.

Figure 22A:
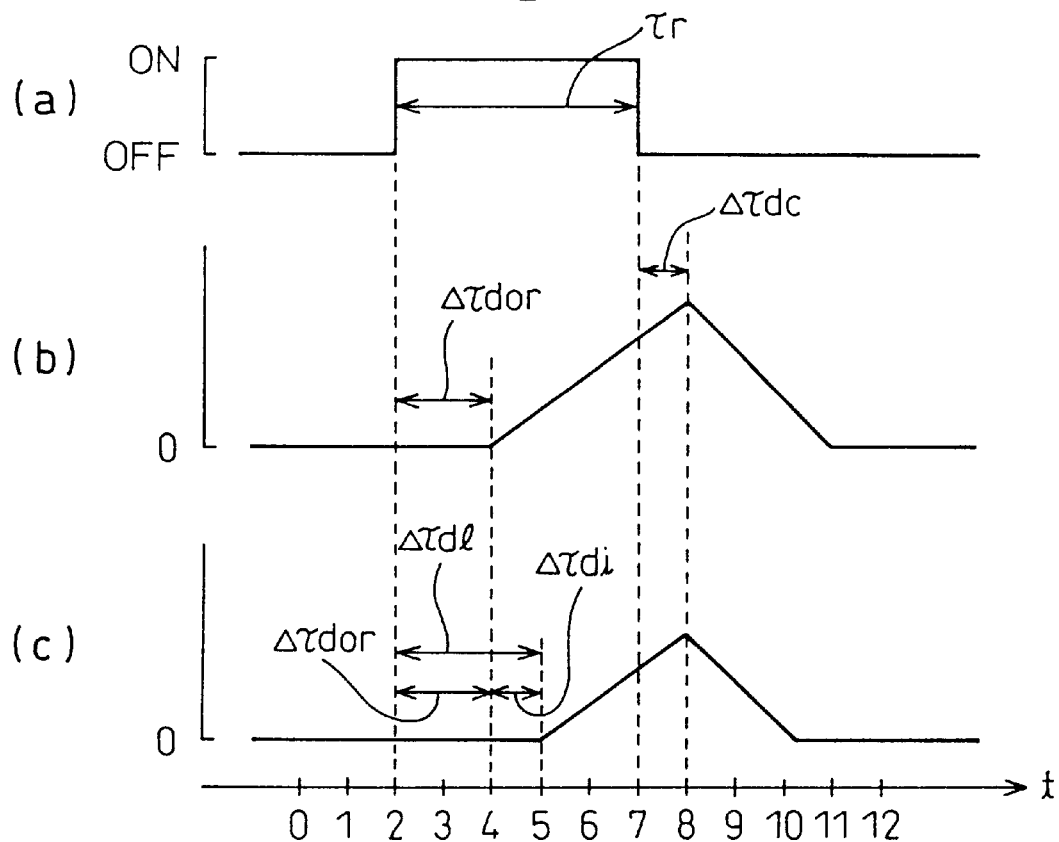
FIG. 22A and FIG. 22B show an example of control for correcting an opening timing in the case where the opening timing becomes delayed due to the effect of pulsation.
Figure 22B:
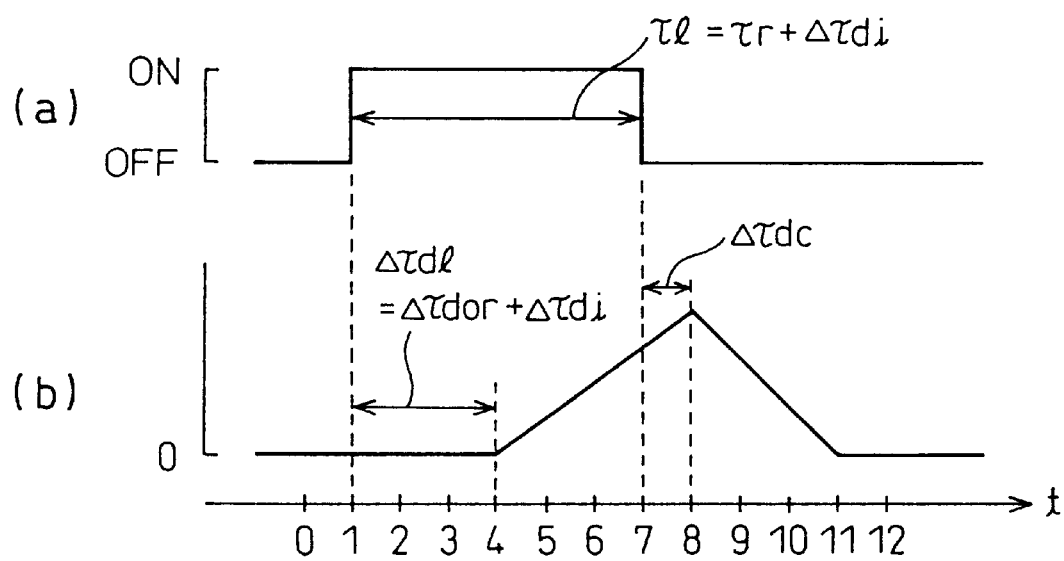

When the opening timing in the main injection is delayed due to the effect of pulsation as well, the operational control value is similarly controlled. That is, (a) of FIG. 22A shows the trend in the opening command signal, (b) shows the trend in the lift in the case of no effect of pulsation, and (c) shows the trend in the lift in the case where the opening timing at the main injection becomes delayed due to the effect of pulsation. Further, (a) of FIG. 22B shows the trend in the opening command signal in the case where the operational control value is corrected, while (b) shows the trend in the lift in the case where the operational control value is corrected as shown in (a).

As shown in (a) of FIG. 22A, the opening command signal is emitted at the time t2. When there is no effect of pulsation, as shown by (b) of FIG. 22A, the needle valve 8 starts to open at the time t4 delayed by exactly a certain delay time Δτdor. Further, when the emission of the opening command signal is stopped at the time t7, the needle valve 8 starts to open at the time t8 delayed by exactly the certain delay time Δτdc.

On the other hand, when the opening timing in the main injection becomes delayed due to the effect of pulsation, as shown by (c) in FIG. 21A, the needle valve 8 starts to open at the time t5 delayed by exactly the time Δτdl (=Δτdor+

Δτdi) longer than the certain delay time Δτdor by exactly the time Δτdi. That is, the opening timing becomes delayed by exactly the time Δτdi. Further, when the emission of the opening command signal is stopped at the time t7, the needle valve 8 starts to close at the time t8 delayed by exactly the same delay time Δτdc as the delay time in the case of no effect of pulsation. In this case, the opening time of the fuel injector 1 becomes shorter than the case of no effect of pulsation, so the fuel injection amount ends up becoming smaller than the target amount.

Therefore, in this case, in the present embodiment, the timing of emission of the opening command signal is advanced by exactly the amount by which the opening timing becomes delayed (above-mentioned time Δτdi) and made the time t1 as shown in (a) of FIG. 22B. In this case, the needle valve 8 starts to open at the time t4 advanced by exactly the time Δτdl (=Δτdor+Δτdi) as shown in (b) of FIG. 22B. That is, the opening timing becomes the same as the opening timing in the case of no effect of pulsation. Further, when the emission of the opening command signal is stopped at the time t7 (time same as emission stopping time of opening command signal in the case of no effect of pulsation), the needle valve 8 starts to close at the same time t8 as the closing timing in the case of no effect of pulsation. According to this, the opening timing of the fuel injector 1 becomes the same as the case of no effect of pulsation, so the fuel injection amount becomes the target amount.

Note that if generally expressing this embodiment, it can be said that a control value relating to operation of the fuel injector is controlled so that the fuel injection time at the main injection (time during which the fuel injector is open in one main injection, therefore time during which fuel is injected from the fuel injector in one main injection) becomes the reference opening timing comprised of the opening timing when the amount of fluctuation of the opening timing in the main injection is zero. Further, in the case of the above embodiment, since the interval time changes, the interval time used when calculating the amount of fluctuation of the main injection amount arising due to fluctuation of the fuel injection pressure and main injection needle speed is calculated based on the corrected opening timing.

Further, even if the opening timing in the main injection changes for example, it is also possible to control an operational control value so that the main injection time becomes the time where the amount of fluctuation of the opening timing in the main injection is zero (reference time). An embodiment of control in this case will be explained in detail with reference to FIG. 23A to FIG. 24B.

Figure 23A:
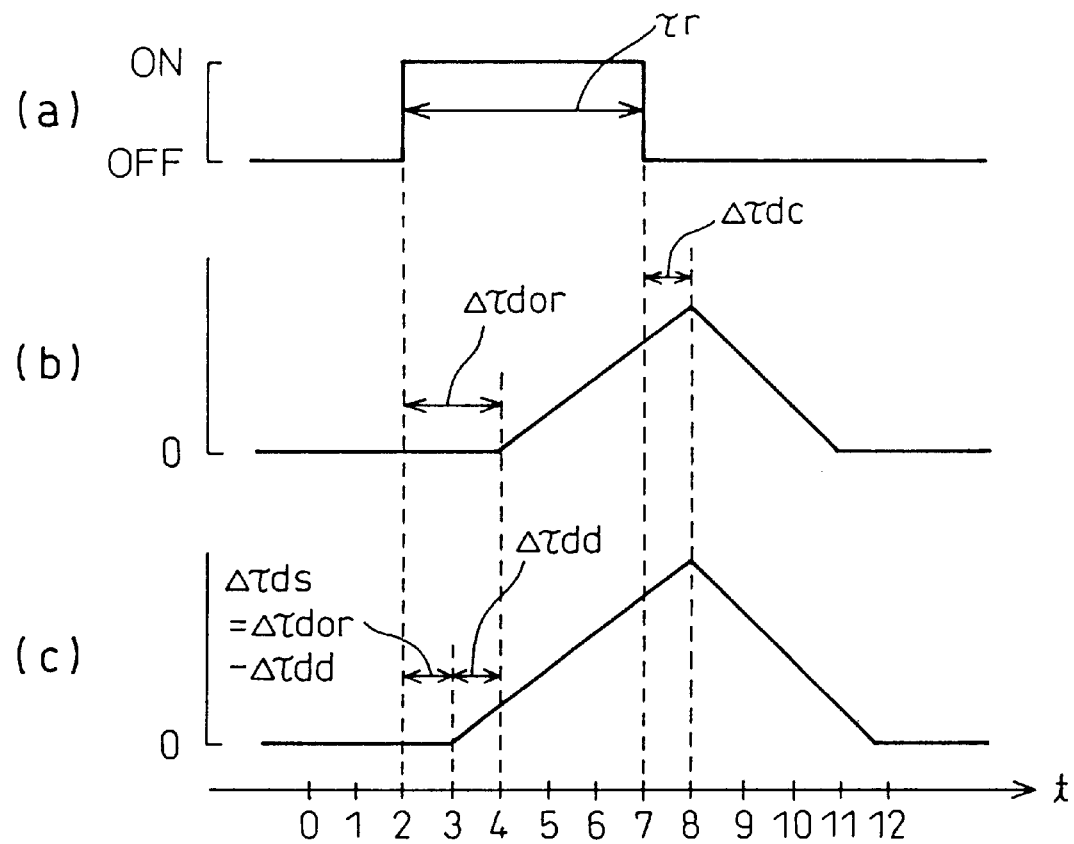
FIG. 23A and FIG. 23B show an example of control for correcting a timing of stopping emission of a command signal for making a fuel injector open in the case where the opening timing becomes advanced due to the effect of pulsation.

(a) to (c) of FIG. 23A are the same as (a) to (c) of FIG. 21A. Further, (a) of FIG. 23A shows the trend in the opening command signal when the operational control value has been corrected, while (b) shows the trend in the lift when the operational control value is corrected as shown in (a).

FIG. 23A is the same as FIG. 21A, so a detailed explanation will be omitted, but simply stated, when the opening timing becomes earlier due to the effect of pulsation ((c) of FIG. 23A), the opening time of the fuel injector 1 becomes longer compared with the case where there is no effect of pulsation ((b) of FIG. 23A), so the fuel injection amount ends up becoming greater than the target amount.

Figure 23B:
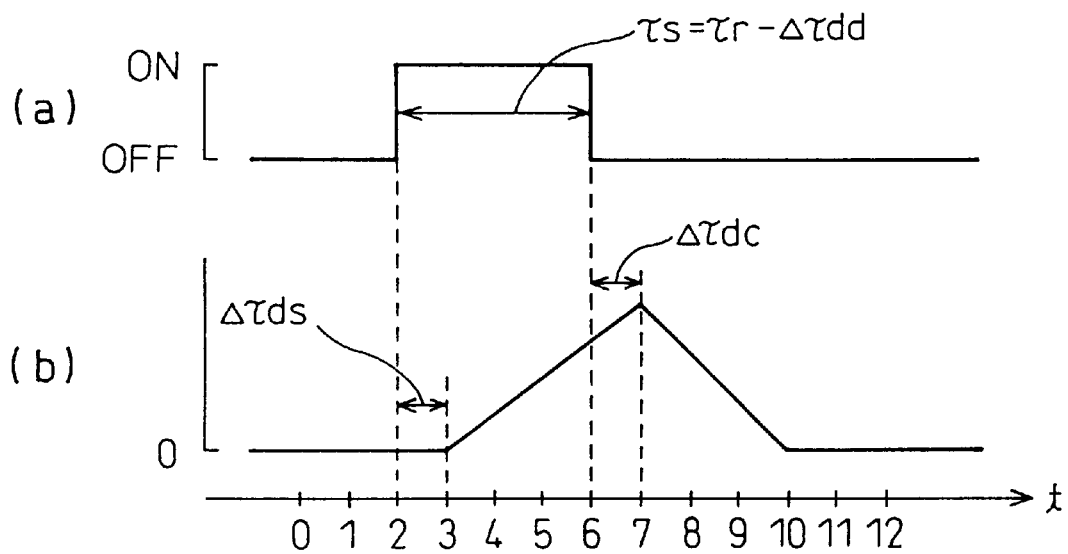

Therefore, in this case, in the present embodiment, the timing of starting emission of the opening command signal is not corrected, but the timing for stopping emission of the opening command signal is advanced by exactly the amount by which the opening timing becomes advanced (above-mentioned time Δτdd) and made the time t6 as shown in (a) of FIG. 23B. In this case, the fuel injector 1 starts opening at the time t3 as shown by (b) of FIG. 23B and starts closing at the time t7 delayed by exactly the time Δτdc from the time t6. According to this, the opening timing of the fuel injector 1 becomes the same as the opening timing in the case of no effect of pulsation, so the fuel injection amount becomes the target amount.

Figure 24A:
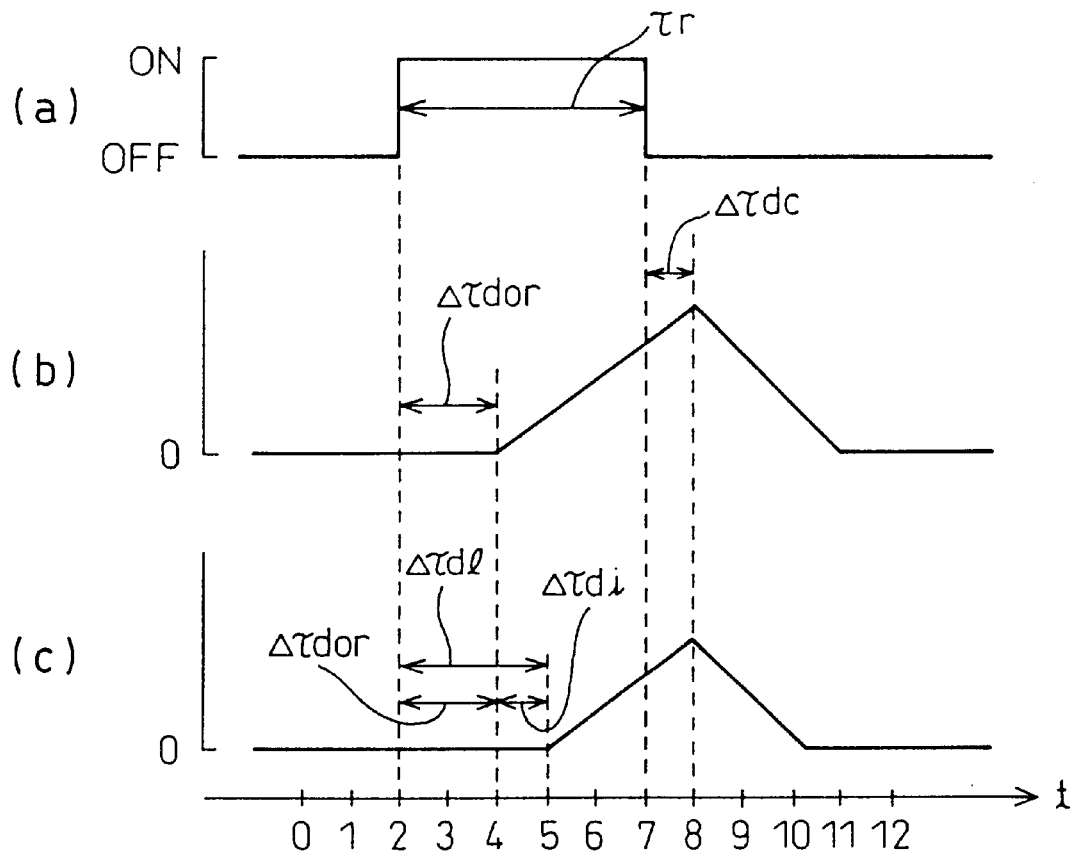
FIG. 24A and FIG. 24B show an example of control for correcting a timing of stopping emission of a command signal for making a fuel injector open in the case where the opening timing becomes delayed due to the effect of pulsation.

The operational control value is controlled in the same way when the opening timing in the main injection is delayed due to the effect of pulsation as well. That is, (a) to (c) of FIG. 24A is the same as (a) to (c) of FIG. 22A. Further, (a) of FIG. 24B shows the trend in the opening command signal in the case where the operational control value is corrected, while (b) shows the trend in the lift in the case where the operational control value is corrected as shown in (a).

FIG. 24A is the same as FIG. 22A, so a detailed explanation will be omitted, but simply speaking, when the opening timing becomes delayed due to the effect of pulsation ((c) of FIG. 24A), the opening timing of the fuel injector 1 becomes shorter than when there is no effect of pulsation ((b) of FIG. 24A), so the fuel injection amount ends up becoming smaller than the target amount.

Figure 24B:
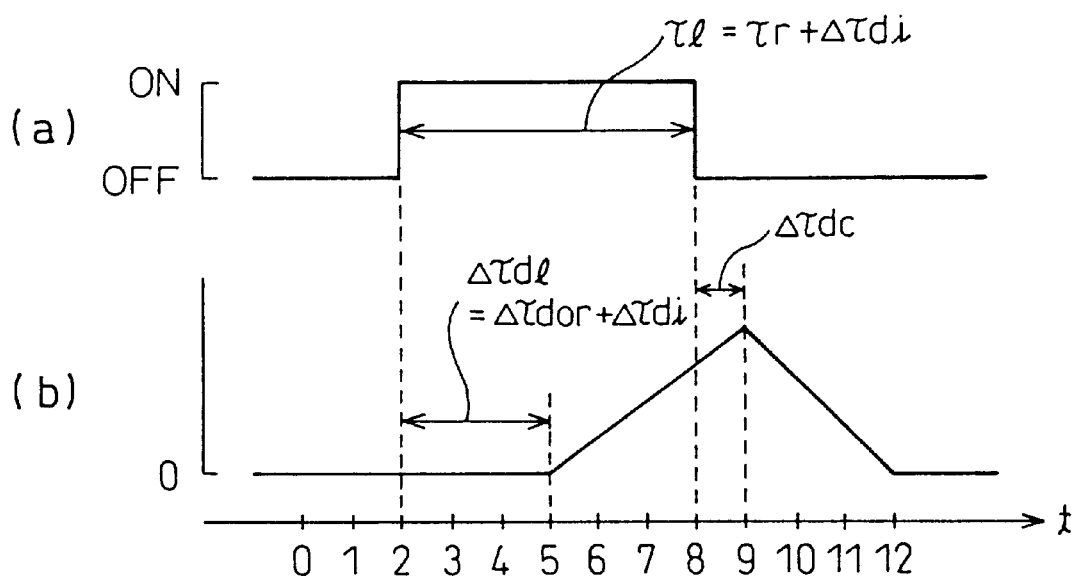

Therefore, in this case, in the present embodiment, the timing of starting emission of the opening command signal is not corrected, but the timing for stopping emission of the opening command signal is delayed by exactly the amount by which the opening timing becomes delayed (above-mentioned time Δτdi) and made the time t8 as shown in (a) of FIG. 24B. In this case, the fuel injector 1 starts opening at the time t5 as shown by (b) of FIG. 24B and starts closing at the time t9 delayed by exactly the time Δτdc from the time t8. According to this, the opening timing of the fuel injector 1 becomes the same as the opening timing in the case of no effect of pulsation, so the fuel injection amount becomes the target amount.

Note that if generally expressing the present embodiment, it can be said that a control value relating to operation of the fuel injector is controlled so that the closing timing of the fuel injector in the main injection becomes a closing timing making the fuel injection time in the main injection (time when fuel injector is open in one main injection and therefore time where fuel is injected from the fuel injector in one main injection) the reference fuel injection time (fuel injection time in case where amount of fluctuation of opening timing in main injection is zero).

Further, in the embodiment explained with reference to FIG. 21A to FIG. 22B, as a result, only the opening timing of the fuel injector is controlled, while in the embodiment explained with reference to FIG. 23A to FIG. 24B, as a result, only the closing timing of the fuel injector is controlled, but these control routines may be combined. That is, as a result, it is also possible to control the opening timing and closing timing of the fuel injector so that the fuel injection time becomes the reference fuel injection time. Therefore, if generally expressing the above embodiment, it can be said that a control value relating to the operation of the fuel injector is controlled so that the fuel injection time at main injection becomes the reference fuel injection time comprised of the fuel injection time when the amount of fluctuation of the opening timing of the fuel injector in that main injection is zero.

Further, in this way, it is also possible to control a control value relating to operation of the fuel injector directly based on the amount of fluctuation of the opening timing in the main injection, so if generally expressing the above embodiment, it can be said that a control value relating to operation of the fuel injector is controlled so that the target amount of fuel is injected from the fuel injector in the main injection based on the estimated amounts of fluctuation of the different parameters in the main injection.

While the invention has been described with reference to specific embodiments chosen for purpose of illustration, it should be apparent that numerous modifications could be made thereto by those skilled in the art without departing from the basic concept and scope of the invention.

What is claimed is:

1. A fuel injection device provided with a fuel injector for injecting fuel to be fed into a combustion chamber of an internal combustion engine and a reservoir for temporarily storing fuel fed to the fuel injector, where fuel is injected at least two times in one engine cycle of the internal combustion engine, pulsation of fuel occurring in the fuel injector due to a prior injection comprised of a first fuel injection is transmitted to the reservoir, reflected at the reservoir, and returns to the fuel injector and, due to the effect of the returned pulsation, the fuel injection amount at a later injection comprised of a second fuel injection fluctuates, the fuel injection device of an internal combustion engine employing as parameters affecting the fuel injection amount at the later injection an opening timing of the fuel injector and an injection pressure of fuel from the fuel injector, estimating the amounts of fluctuation of the parameters at the later injection arising due to the pulsation, and controlling a control value relating to operation of the fuel injector based on the estimated amounts of fluctuation of the parameters at the later injection so that the target amount of fuel is injected from the fuel injector at the later injection.

2. A fuel injection device as set forth in claim 1, wherein the amounts of fluctuation of the parameters at the later injection represent the amount of fluctuation of the fuel injection amount at the later injection arising due to fluctuation in the parameters at the later injection, the amount of fluctuation of the fuel injection amount at the later injection arising due to fluctuation in the parameters at the later injection is estimated based on the estimated amounts of fluctuation of the parameters at the later injection, and a control value relating to operation of the fuel injector is controlled based on the estimated amount of fluctuation of the fuel injection amount at the later injection so that the target amount of fuel is injected from the fuel injector at the later injection.

3. A fuel injection device as set forth in claim 1, wherein a control value relating to operation of the fuel injector is controlled so that the fuel injection time at the later injection becomes a reference fuel injection time comprised of the fuel injection time in the case where the amount of fluctuation of the opening timing of the fuel injector at the later injection is zero.

4. A fuel injection device as set forth in claim 1, wherein a control value relating to operation of the fuel injector is controlled so that the opening timing of the fuel injector at the later injection becomes a reference opening timing comprising the opening timing in the case where the amount of fluctuation of the opening timing at the later injection is zero.

5. A fuel injection device as set forth in claim 4, wherein the amounts of fluctuation of the parameters at the later injection are calculated from functions having as variables the interval time comprised of the time from the prior injection to the later injection and, when a control value relating to operation of the fuel injector is controlled so that the opening timing at the later injection becomes the reference opening timing, the interval time used for estimating the amount of fluctuation of the fuel injection pressure at the later injection is calculated assuming that the fuel injector opens at the reference opening timing.

6. A fuel injection device as set forth in claim 3, wherein a control value relating to operation of the fuel injector is controlled so that a closing timing of the fuel injector at the later injection becomes a closing timing having the fuel injection time at the later injection as the reference fuel injection time.

7. A fuel injection device as set forth in claim 1, wherein an opening speed of the fuel injector is employed in addition to the above parameters.

8. A fuel injection device as set forth in claim 1, wherein when the fuel injection time at the later injection is shorter than a predetermined time, only the opening timing of the fuel injector is employed as a parameter.

9. A fuel injection device as set forth in claim 1, wherein the fuel injector has at least one injection hole for injecting fuel, a needle valve moving reciprocally inside the fuel injector and closing the injection hole, a first chamber storing fuel applying pressure to a wall surface of the needle valve at the injection hole side and to be injected from the injection hole, and a second chamber positioned at an opposite side to the first chamber relative to the needle valve and storing fuel, and the amount of fluctuation of the opening timing at the later injection is estimated based on a time-differentiated value of pressure of the fuel in the first chamber.

10. A fuel injection device as set forth in claim 1, wherein a relationships between amounts of fluctuation of the parameters at the later injection and the interval time when fixing conditions other than the interval time comprised of the time from the prior injection to the later injection are found in advance, and the amounts of fluctuation of the parameters at the later injection are estimated from the interval time based on the relationships.

11. A fuel injection device as set forth in claim 10, wherein the amounts of fluctuation of the parameters at the later injection differ according to the fuel injection time in the prior injection, the fuel injection time in the prior injection is employed as the condition other than the interval time, the relationships between the amounts of fluctuation of the parameters at the later injection and the interval time are found for the fuel injection time in the prior injection serving as a reference, and the amounts of fluctuation of the parameters at the later injection estimated based on the relationships are corrected in accordance with the fuel injection time at that time in the prior injection.

12. A fuel injection device as set forth in claim 10, wherein the amounts of fluctuation of the parameters at the later injection differ according to the fuel injection time at the later injection, the fuel injection time at the later injection is employed as the condition other than the interval time, the relationships between the amounts of fluctuation of the parameters at the later injection and the interval time are found for the fuel injection time at the later injection serving as a reference, and the amounts of fluctuation of the parameters at the later injection estimated based on the relationships are corrected in accordance with the fuel injection time at that time at the later injection.

13. A fuel injection device as set forth in claim 10, wherein the amounts of fluctuation of the parameters at the later injection differ according to at least one of an average pressure of the fuel and a temperature of the fuel, at least one of the average pressure of the fuel and the temperature of the fuel is employed as the condition other than the interval time, the relationships between the amounts of fluctuation of the parameters at the later injection and the interval time are found for the average pressure of the fuel serving as a reference and the temperature of the fuel serving as a reference, and the amounts of fluctuation of the parameters at the later injection estimated based on the relationships are corrected in accordance with at least one of the average pressure of the fuel at that time and the temperature of the fuel at that time.

14. A fuel injection device as set forth in claim 10, wherein the amounts of fluctuation of the parameters at the later injection differ according to the pulsation propagation speed in the fuel, the pulsation propagation speed in the fuel is employed as the condition other than the interval time, the relationships between the amounts of fluctuation of the parameters at the later injection and the interval time are found for the pulsation propagation speed in the fuel serving as a reference, and the amounts of fluctuation of the parameters at the later injection estimated based on the relationships are corrected in accordance with the pulsation propagation speed in the fuel at that time.

15. A fuel injection device as set forth in claim 14, wherein the amounts of fluctuation of the parameters at the later injection estimated based on the above relationships are corrected so that the faster the pulsation propagation speed in the fuel at that time, the shorter the interval time the amounts of fluctuation correspond to.

16. A fuel injection device as set forth in claim 14, wherein the pulsation propagation speed in the fuel is calculated from a function having at least one of the average pressure of the fuel and the temperature of the fuel as a variable.

17. A fuel injection device as set forth in claim 14, wherein the device is provided with a pressure sensor for detecting a pressure of the fuel and a change in pressure of the fuel found from an output value of the pressure sensor is used to calculate the pulsation propagation speed in the fuel.

18. A fuel injection device as set forth in claim 17, wherein the propagation speed is calculated when a predetermined condition stands.

19. A fuel injection device as set forth in claim 18, wherein the predetermined condition is that an extent of change of the average pressure of the fuel is smaller than a predetermined extent.

20. A fuel injection device as set forth in claim 18, wherein the predetermined condition is that the average pressure of the fuel is a predetermined pressure and the predetermined pressure includes a plurality of values.

21. A fuel injection device as set forth in claim 18, wherein a pulsation propagation speed in the fuel when the temperature of the fuel is a predetermined reference temperature and the average pressure of the fuel is a predetermined reference pressure is stored in advance as a reference propagation speed, the predetermined condition is that the temperature of the fuel is the reference temperature and the average pressure of the fuel is the reference pressure, and the propagation speed calculated when the predetermined condition stands is made the reference propagation speed.

22. A fuel injection device as set forth in claim 17, wherein the device is provided with a plurality of fuel injectors, fuel is fed to these fuel injectors from the reservoir, and the pulsation propagation speed in the fuel is calculated for the fuel injector at the location furthest from the pressure sensor.

23. A fuel injection device as set forth in claim 10, wherein the amounts of fluctuation of the parameters at the later injection differ in accordance with the average pressure of the fuel, the average pressure of the fuel is employed as the condition other than the interval time, the relationships between the amounts of fluctuation of the parameters at the later injection and the interval time are found for the average pressure of the fuel serving as a reference, the estimated amounts of fluctuation of the parameters at the later injection are corrected so that the amount of fluctuation of the fuel injection amount at the later injection becomes larger in a plus direction when the average pressure of the fuel at that time is higher than the average pressure of the fuel serving as a reference, and the estimated amounts of fluctuation of the parameters at the later injection are corrected so that the amount of fluctuation of the fuel injection amount at the later injection becomes larger in a minus direction when the average pressure of the fuel at that time is lower than the average pressure of the fuel serving as a reference.

24. A fuel injection device as set forth in claim 1, wherein fuel is injected at least three times in one engine cycle of the internal combustion engine, and the total of the amounts of fluctuation of the parameters in the third fuel injection arising due to pulsation occurring due to the first fuel injection and the amounts of fluctuation of the parameters in the third fuel injection arising due to pulsation occurring due to the second fuel injection are made the amounts of fluctuation of the parameters in the third fuel injection.

* * * * *